(12) United States Patent
Oh

(10) Patent No.: US 10,142,310 B2
(45) Date of Patent: Nov. 27, 2018

(54) METHOD AND CLOUD SERVER FOR MANAGING DEVICE

(71) Applicant: Samsung Electronics Co., Ltd., Suwon-si, Gyeonggi-do (KR)

(72) Inventor: Jung-hyun Oh, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 119 days.

(21) Appl. No.: 14/887,972

(22) Filed: Oct. 20, 2015

(65) Prior Publication Data

US 2016/0156604 A1    Jun. 2, 2016

(30) Foreign Application Priority Data

Dec. 1, 2014 (KR) .......................... 10-2014-0169970

(51) Int. Cl.
*H04L 29/06* (2006.01)
*H04L 29/08* (2006.01)

(52) U.S. Cl.
CPC .......... *H04L 63/08* (2013.01); *H04L 67/1002* (2013.01)

(58) Field of Classification Search
None
See application file for complete search history.

(56) References Cited

U.S. PATENT DOCUMENTS

| 2005/0262132 | A1* | 11/2005 | Morita | G06F 21/6218 |
| 2012/0077431 | A1 | 3/2012 | Fyke et al. | |
| 2014/0068705 | A1 | 3/2014 | Chambers et al. | |
| 2014/0120905 | A1* | 5/2014 | Kim | G07C 9/00857 |
| | | | | 455/426.1 |
| 2016/0116510 | A1* | 4/2016 | Kalous | G07C 9/00571 |
| | | | | 340/636.1 |

FOREIGN PATENT DOCUMENTS

| EP | 2439970 A1 | 4/2012 |
| KR | 10-2012-0079623 A | 7/2012 |
| KR | 10-1202029 B1 | 11/2012 |
| KR | 10-2013-0077433 A | 7/2013 |
| KR | 10-2014-0003044 A | 1/2014 |
| KR | 10-2014-0038828 A | 3/2014 |
| WO | 2002-093502 A1 | 11/2002 |

* cited by examiner

*Primary Examiner* — Michael R Vaughan
(74) *Attorney, Agent, or Firm* — Jefferson IP Law, LLP

(57) ABSTRACT

A method of managing a device is provided. The method includes registering execution authorization information regarding a function provided by a first device, receiving a request for determining whether a second device that requests execution of a function provided by the cloud server has authorization to perform the function provided by the first device from the first device, authenticating whether the second device has authorization for performing a function provided by the first device, and transmitting a result of the authentication to the first device.

16 Claims, 21 Drawing Sheets

FIG. 5A

| ACCESS KEY (530) | DEVICE (510) | FUNCTION (520) | NUMBER OF TIMES (540) |
|---|---|---|---|
| X13546 | Door lock | Open | 1times |
| Y24513 | Door lock | Open | Unlimit |
| S12564 | TV | Turn on | Unlimit |
| F8421 | AIR CONDITIONER | Turn on | Unlimit |
| A56846 | TELEPHONE | Turn on | Unlimit |

FIG. 5B

| AUTHENTICATION KEY (545) | DEVICE (510) | FUNCTION (520) | NUMBER OF TIMES (540) |
|---|---|---|---|
| Aaaaa | Door lock | Open | 1times |
| Bbbbb | Door lock | Open | Unlimit |
| Ccccc | TV | Turn on | Unlimit |
| Ddddd | AIR CONDITIONER | Turn on | Unlimit |
| Eeeee | TELEPHONE | Turn on | Unlimit |

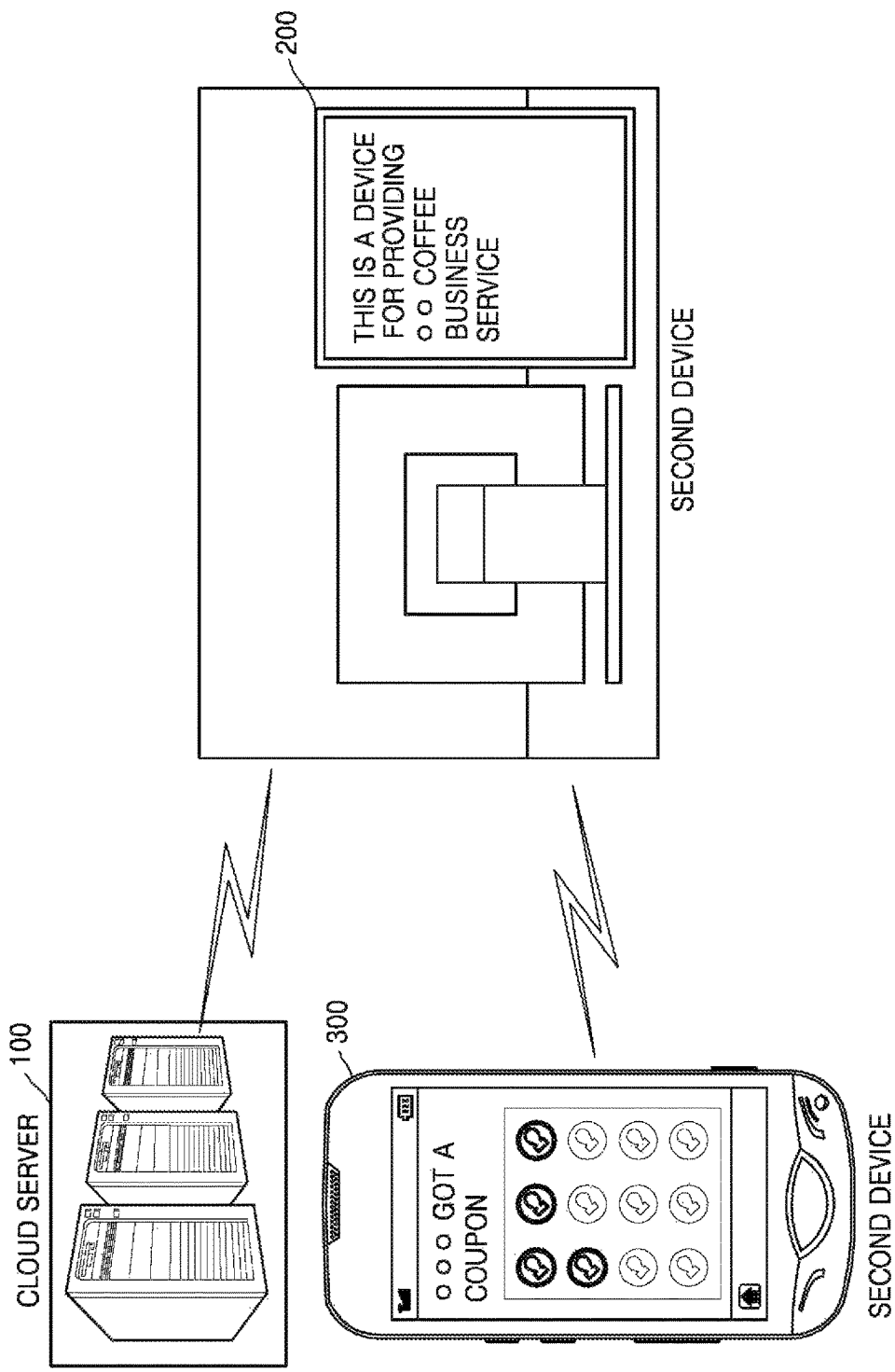

METHOD AND CLOUD SERVER FOR MANAGING DEVICE

CROSS-REFERENCE TO RELATED APPLICATION(S)

This application claims the benefit under 35 U.S.C. § 119(a) of a Korean patent application filed on Dec. 1, 2014, in the Korean Intellectual Property Office and assigned Serial number 10-2014-0169970, the entire disclosure of which is hereby incorporated by reference.

TECHNICAL FIELD

The present disclosure relates to a method of managing a device and a cloud server for performing the method.

BACKGROUND

Along with the increased use of the Internet of things (IoT) in homes, companies, and public services, interest in methods of embodying IoT is growing.

More particularly, interest in methods of managing access to functions provided by various devices connected to a network is growing.

Therefore, a need exists for a method of managing access to functions provided by various devices connected to a network through a cloud server in an IoT environment.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide methods of managing a device through a cloud server.

Additional aspects will be set forth in part in the description which follows and, in part, will be apparent from the description, or may be learned by practice of the presented embodiments.

In accordance with an aspect of the present disclosure, a method, performed by a cloud server, of managing a device, is provided. The method includes registering execution authorization information regarding a function provided by a first device, receiving from the first device, a request for determining whether a second device that requests execution of the function provided by the first device has authorization to perform the function provided by the first device, authenticating whether the second device has the authorization to perform the function provided by the first device, and transmitting a result of the authentication to the first device.

In the receiving of the request, authentication information regarding the second device, which is received by the first device from the second device, is also received by the cloud server.

The first device provides a plurality of functions, and a function selected by the second device from among the plurality of functions provided by the first device is authenticated.

The authenticating of whether the second device has the authorization to perform the function provided by the first device includes transmitting, if the second device has no authorization to perform the function provided by the first device, an authorization determination request to a device of an administrator of the first device, and receiving an authentication determination result from the device of the administrator of the cloud server.

The authenticating of whether the second device has the authorization to perform the function provided by the first device includes determining whether the second device has authorization to perform the function provided by the first device by comparing authentication information regarding the second device included in the received authentication request to the registered execution authorization information regarding the first device.

The method further includes deleting, if it is determined that the second device has authorization to perform the function provided by the first device, information corresponding to the authentication information regarding the second device in the registered execution authorization information regarding the first device.

The method further includes receiving an input of an administrator of the first device and deleting the registered execution authorization information regarding the first device.

The registering of the execution authorization information regarding the first device includes receiving execution authorization information and access information regarding the first device, determining whether to register the received execution authorization information based on the access information, and registering the execution authorization information based on a result of the determination.

In accordance with another aspect of the present disclosure, a cloud server is provided. The cloud server includes a controller configured to register execution authorization information regarding a first device, and a communication unit configured to receive, from the first device, a request for authenticating whether a second device that requests execution of a function provided by the first device has authorization to perform the function provided by the first device, wherein the communication unit transmits a result of the authentication to the first device.

The communication unit is further configured to receive authentication information regarding the second device received by the first device from the second device.

The first device provides a plurality of functions, and the controller is further configured to authenticate a function selected by the second device from among the plurality of functions provided by the first device.

If the second device has no authorization to perform the function provided by the first device, the controller is further configured to control transmission of an authorization determination request to a device of an administrator of the first device, and the communication unit is further configured to receive an authentication determination result from the device of the administrator of the cloud server.

The controller is further configured to determine whether the second device has authorization to perform the function provided by the first device by comparing authentication information regarding the second device included in the received authentication request to the registered execution authorization information regarding the first device.

If it is determined that the second device has authorization to perform the function provided by the first device, the controller is further configured to delete information corresponding to the authentication information regarding the second device in the registered execution authorization information regarding the first device.

The controller is further configured to receive an input of an administrator of the first device and delete the registered execution authorization information regarding the first device.

The controller is further configured to receive execution authorization information and access information regarding the first device, determine whether to register the received execution authorization information based on the access information, and register the execution authorization information based on a result of the determination.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 5A and 5B are diagrams illustrating execution authorization information registered to a cloud server according to various embodiments of the present disclosure;

FIG. 21 is a diagram illustrating a method whereby a cloud server controls a first device according to an embodiment of the present disclosure.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Throughout the specification, it will be understood that when a portion is referred to as being "connected to" another portion, it can be "directly connected to" the other portion or "electrically connected to" the other portion through another element. Furthermore, it will be further understood that the terms "comprises" and/or "comprising" used herein specify the presence of stated features or components, but do not preclude the presence or addition of one or more other features or components.

Hereinafter, various embodiments will be described with reference to accompanying drawings.

Figure 1:
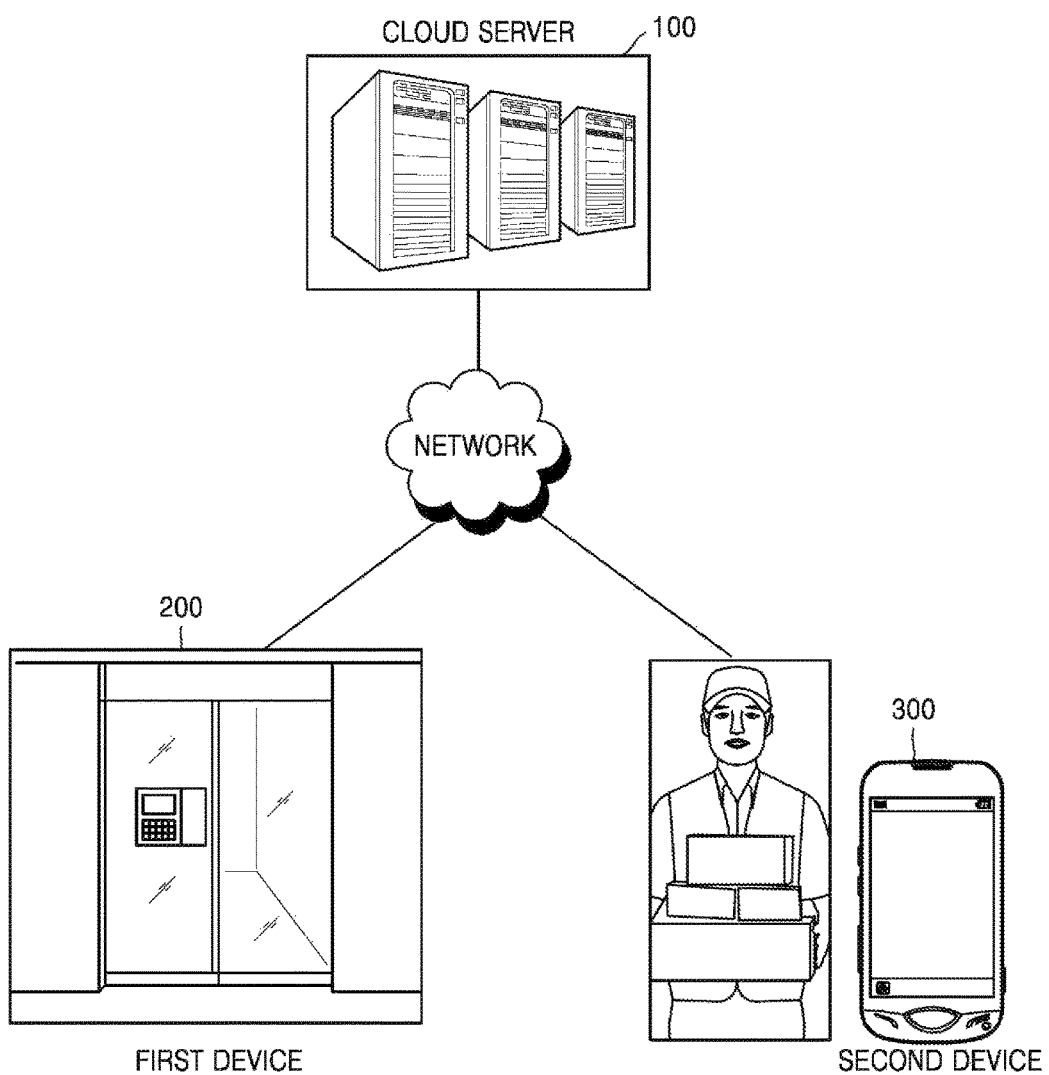
FIG. 1 is a diagram illustrating a cloud server and a device connected to the cloud server through a network according to an embodiment of the present disclosure.

FIG. 1 is a diagram illustrating a cloud server and a device connected to the cloud server through a network according to an embodiment of the present disclosure.

Referring to FIG. 1, a cloud server 100, a first device 200, and a second device 300 may operate in an Internet of things (IoT) environment. The IoT environment refers to an environment in which devices are connected to each other through a wired network or a wireless network and share information. The cloud server 100 may perform various functions with the first device 200 and the second device 300 by using a network. For example, the cloud server 100 may control access to the first device 200 by other devices.

The cloud server 100 may register the first device 200. Furthermore, the cloud server 100 may register at least one function provided by the first device 200. The first device 200 refers to a device connected to the cloud server 100 through a network in the IoT environment. For example, the first device 200 may include a digital door lock, a lamp, a refrigerator, an audio device, and a device used for providing a service requested by an administrator of the first device 200, but is not limited thereto.

The second device 300 may access the first device 200. Furthermore, the second device 300 may be connected to the first device 200. For example, the second device 300 of a parcel delivery service provider may access a digital door lock, which is the first device 200, and may be connected to the digital door lock.

The second device 300 may request the first device 200 to perform one of functions provided by the cloud server 100. For example, a device of a parcel delivery service provider may request a digital door lock, which is the first device 200, to perform a door open function.

Based on a function execution request of the second device 300, the first device 200 may request the cloud server 100 to authenticate the second device 300.

Based on the authentication request of the first device 200, the cloud server 100 may authenticate the second device 300 and transmit a result of authenticating the second device 300 to the first device 200.

Figure 2:
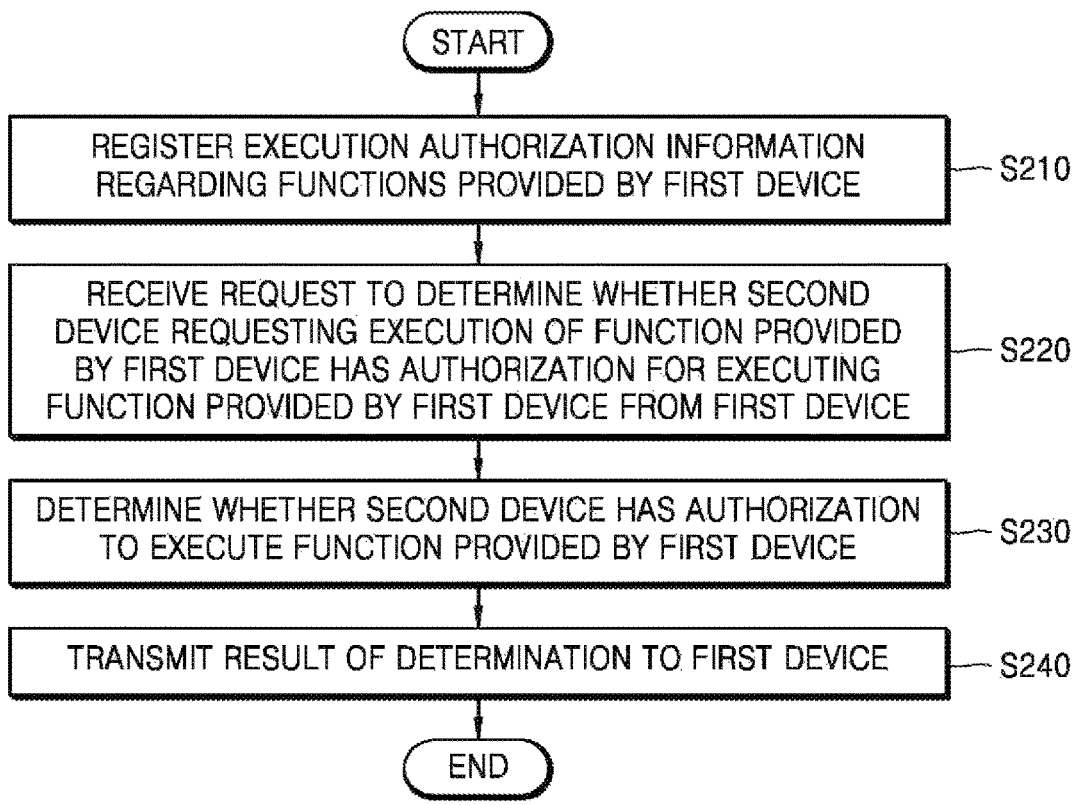
FIG. 2 is a flowchart illustrating a method that a cloud server authenticates a second device based on an authentication request received from the cloud server according to an embodiment of the present disclosure.

FIG. 2 is a flowchart illustrating a method whereby a cloud server authenticates a second device based on an authentication request received from the cloud server according to an embodiment of the present disclosure.

Referring to FIG. 2, in an operation S210, the cloud server 100 may register execution authorization information regarding the first device 200.

The cloud server 100 may register the first device 200. The first device 200 may include a digital door lock, a lamp, a refrigerator, an audio device, a TV, an electric/water meter, and the like.

The cloud server 100 may register at least one function provided by the first device 200. For example, if a digital door lock is registered to the cloud server 100, the cloud server 100 may register door open function and door close function, which are functions of the digital door lock. The cloud server 100 may receive functions provided by the first device 200 from the first device 200 or a user device and register the received functions. However, the inventive concept is not limited thereto, and the cloud server 100 may register functions provided by the first device 200 in various ways.

The cloud server 100 may obtain execution authorization information regarding the first device 200. The execution authorization information refers to information indicating an object capable of performing at least one function provided by the first device 200. For example, the execution authorization information may include device identification information, an authentication key, service identification information, or a combination thereof. However, the inventive concept is not limited thereto, and the execution authorization information may include various other information.

The cloud server 100 may determine whether to register obtained execution authorization information in various ways. For example, the cloud server 100 may determine whether to register received execution authorization information based on access information received together with the execution authorization information. For example, if an access key received together with an authentication key is identical to an access key possessed by the cloud server 100, the cloud server 100 may determine to register the authentication key.

Furthermore, if the cloud server 100 receives execution authorization information from a particular device and the particular device is a device with authorization to register execution authorization information, the cloud server 100 may register the execution authorization information. However, the inventive concept is not limited thereto, and the cloud server 100 may determine whether to register execution authorization information in various other ways.

In an operation S220, a second device requesting to perform a function provided by a first device may receive an authentication request to determine whether the second device has authorization to perform at least one function provided by the first device.

The first device 200 may be connected to the second device 300 through a network. The second device 300 refers to a device that may request a first device registered to the cloud server 100 to perform a function provided by the first device.

For example, a wearable device that may request turn-on, which is a function of a TV registered to the cloud server 100, may be included in the second device 300. Furthermore, a mobile phone that may request turn-on, which is a function of a light bulb registered to the cloud server 100, may be included in the second device 300. However, the inventive concept is not limited thereto.

The second device 300 may include a device of a service provider, which supports a service requested by an administrator of the first device 200. For example, if the administrator of the first device 200 requests a delivery service, a wearable device that may request door open function of a digital door lock registered to the cloud server 100 may be included in the second device 300. However, the inventive concept is not limited thereto.

The second device 300 may request the first device 200 to perform a function provided by the first device 200 through a network. For example, the second device 300 may select one of at least one or more functions provided by the first device 200 and request to perform the selected function.

When the second device 300 requests execution of a function provided by the cloud server 100, the second device 300 may transmit authentication information regarding the second device 300 to the first device 200. The authentication information regarding the second device 300 refers to information for the cloud server 100 to determine whether the second device 300 has authorization to perform at least one function provided by the first device 200.

For example, the authentication information regarding the second device 300 may include identification information regarding the second device 300, an authentication key possessed by the second device 300, information regarding a location of the second device 300, a manufacturer's serial number of the second device 300, identification information regarding services supported by the second device 300, or a combination thereof. However, the inventive concept is not limited thereto.

As the second device 300 requests execution of a function provided by the second device 300, the cloud server 100 may receive a request for authenticating whether the second device 300 has authorization to perform the function provided by the first device 200 from the first device 200. The cloud server 100 may receive authentication information regarding the second device 300 together with the authentication request.

In an operation S230, the cloud server 100 may authenticate whether the second device 300 has an execution authorization with respect to the first device 200.

The cloud server 100 may authenticate the second device 300 based on the authentication request received from the first device 200. The authentication refers to determination of whether the second device 300 has authorization to perform at least one function provided by the first device 200.

For example, the cloud server 100 may determine whether the second device 300 has authorization to perform at least one function provided by the first device 200 by using the authentication information regarding the second device 300 included in the authentication request.

The cloud server 100 may authenticate the second device 300 by using registered execution authorization information. For example, the cloud server 100 may authenticate the second device 300 by comparing information included in the authentication information regarding the second device 300 received from the first device 200 to registered execution authorization information.

For example, if the authentication information regarding the second device 300 includes a first authentication key, the cloud server 100 may search for the first authentication key in registered execution authorization information. Furthermore, the cloud server 100 may authenticate the second device 300 based on execution authorization set to a found first authentication key. Specifically, the cloud server 100 may determine whether the second device 300 has authorization to perform a particular function of the first device 200 that the second device 300 requested to perform.

Furthermore, if the authentication information regarding the second device 300 received by the cloud server 100 includes identification information regarding the second device 300, the cloud server 100 may search for identification information regarding the second device 300 in registered execution authorization information. Furthermore, based on an execution authorization set to found identification information regarding the second device 300, the cloud server 100 may determine whether the second device 300 has authorization to perform at least one function provided by the first device 200.

If it is determined that the second device 300 does not have authorization to perform at least one function provided by the first device 200, the cloud server 100 may transmit an authorization determination request to a pre-set user device. The cloud server 100 may transmit authorization determination requests of various forms. For example, an authorization determination request may be transmitted in the form of a text message or a video message. However, the inventive concept is not limited thereto.

A user device 400 may determine whether the second device 300 has authorization to perform at least one function provided by the first device 200 based on the received authorization determination request. For example, the user device 400 may determination the authorization of the second device 300. Furthermore, the user device 400 may determine the authorization of the second device 300 by using authentication information regarding the second device 300 that is received together with an authorization determination request. However, the inventive concept is not limited thereto.

The cloud server 100 may receive a result of determining the authorization from the user device 400.

In an operation S240, the cloud server 100 may transmit a result of the authentication to the first device 200.

The cloud server 100 may transmit a result of authenticating the second device 300 to the first device 200. For example, the cloud server 100 may transmit a result of authentication based on authentication performed by the cloud server 100 or transmit a result of authentication based on a result of determining the authorization received from the user device 400.

The first device 200 may perform a function of the first device 200 based on a result of authentication received from the cloud server 100. For example, the first device 200 may perform a function that the second device 300 requested to perform from among at least one or more functions provided by the first device 200 based on a received result of authentication.

Figure 3:
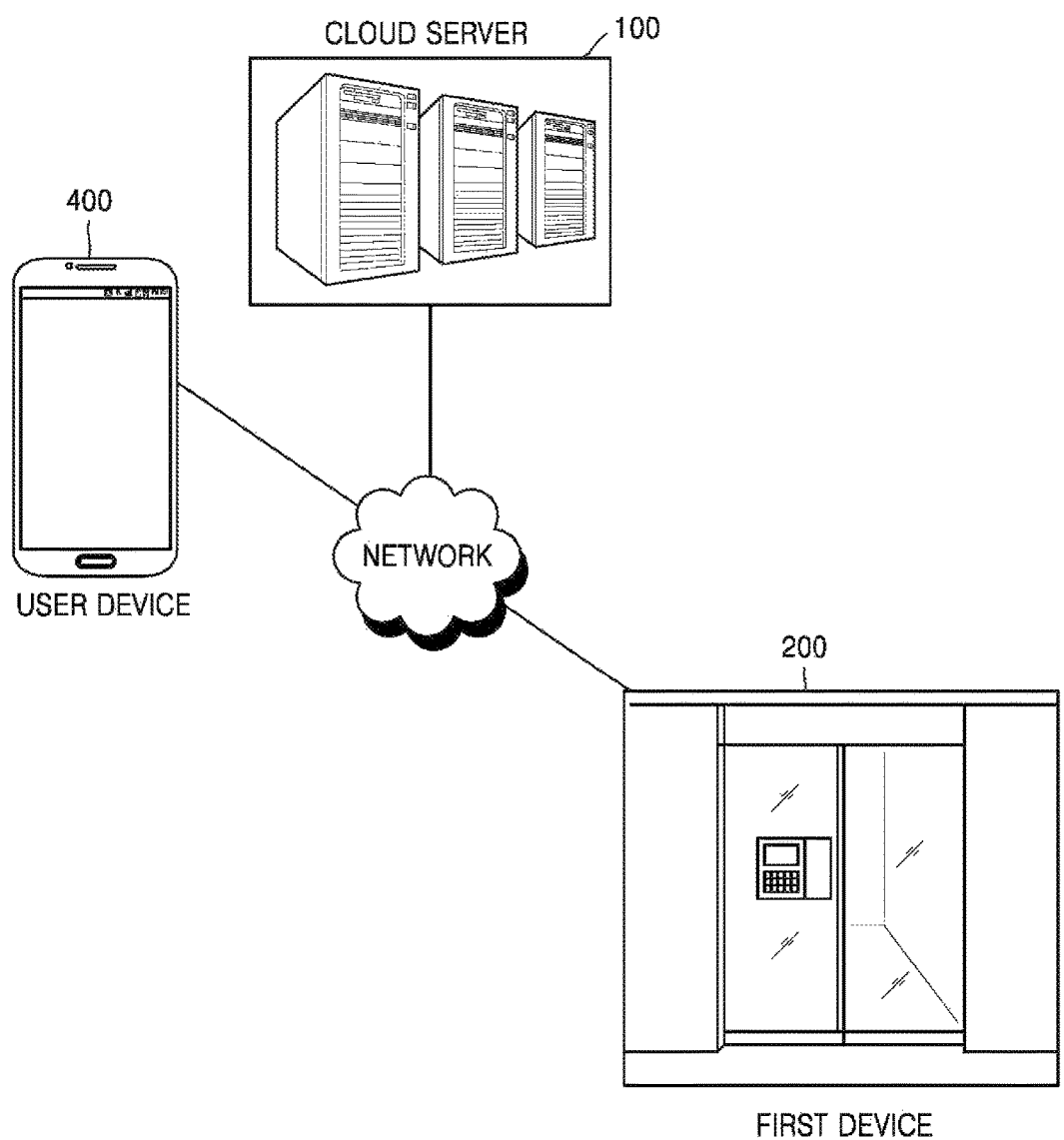
FIG. 3 is a diagram illustrating a method whereby an administrator of a first device registers execution authorization information regarding the first device to a cloud server according to an embodiment of the present disclosure.

FIG. 3 is a diagram illustrating a method whereby an administrator of a first device registers execution authorization information regarding the first device to a cloud server according to an embodiment of the present disclosure.

Referring to FIG. 3, the cloud server 100 may receive execution authorization information from the user device 400. The user device 400 refers to a device used by an administrator of the first device 200 to manage the first device 200. The user device 400 may have authorization to register execution authorization information regarding the first device 200 to the cloud server 100.

Referring to FIG. 3, the cloud server 100 may register execution authorization information received from the user device 400. For example, if an authentication key regarding the first device 200 is received from the user device 400, the cloud server 100 may register the received authentication key. Furthermore, in case of registering an authentication key, the cloud server 100 may set an execution authorization for performing at least one function provided by the first device 200 to the authentication key based on a user-input signal received from user device 400.

Furthermore, if execution authorization information regarding the first device 200 is received from a device having authorization to register execution authorization information other than the user device 400, the cloud server 100 may register the execution authorization information.

An administrator of the first device 200 may delete execution authorization information registered to the cloud server 100. For example, the cloud server 100 may delete particular information from among registered execution authorization information based on an input of the administrator of the first device 200. The cloud server 100 may receive an input of the administrator of the first device 200 through the user device 400.

Figure 4:
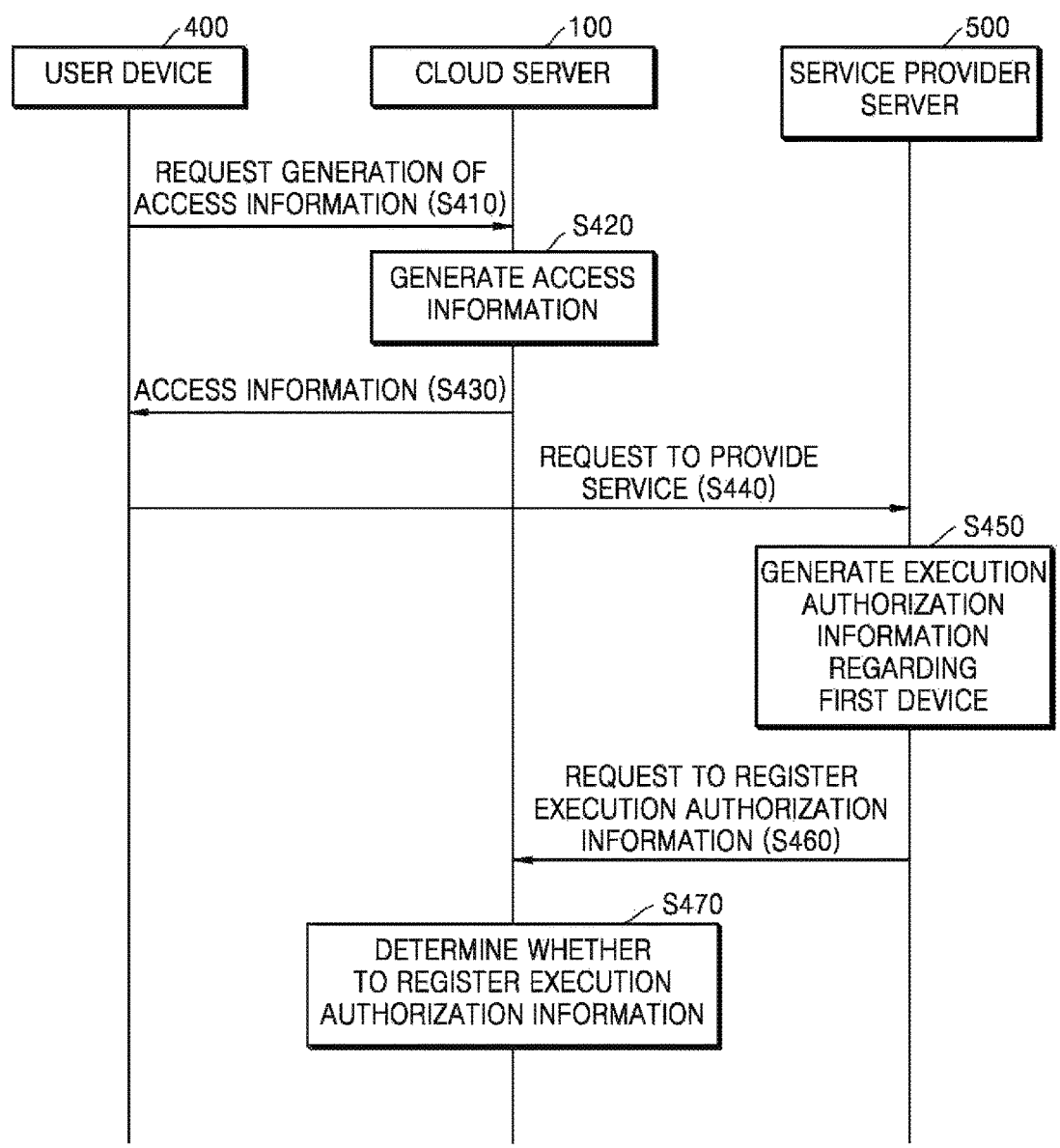
FIG. 4 is a diagram illustrating a method whereby a person without authorization for registering execution authorization information regarding a first device registers execution authorization information regarding the first device to a cloud server according to an embodiment of the present disclosure.

FIG. 4 is a diagram illustrating a method whereby a person without authorization to register execution authorization information regarding a first device registers execution authorization information regarding the first device to a cloud server according to an embodiment of the present disclosure.

Referring to FIG. 4, in an operation S410, the user device 400 may request the cloud server 100 to generate access information. The access information refers to information for registering received execution authorization information when the cloud server 100 received the execution authorization information from a device without authorization to register execution authorization information.

In an operation S420, the cloud server 100 may generate access information. For example, the cloud server 100 may generate access information by using identification information regarding the user device 400 and a hash function. However, the inventive concept is not limited thereto, and the cloud server 100 may generate access information in various ways.

In an operation S430, the user device 400 may receive access information from the cloud server 100. For example, the user device 400 may receive access information from the cloud server 100 through a network.

In an operation S440, an administrator of the first device 200 may request a service provider to provide a service. For example, the administrator of the first device 200 may request a service provider server 500 managed by the service provider to provide a service.

According to an embodiment of the present disclosure, the user device 400 may receive an input of the administrator of the first device 200 and request parcel delivery service. Furthermore, the user device 400 may transmit access information received from the cloud server 100 while the user device 400 is requesting the parcel delivery service.

In an operation S450, the service provider server 500 may generate execution authorization information regarding the first device 200. For example, the service provider server 500 may generate an authentication key by using a service reception number or an arbitrary random number. However, the inventive concept is not limited thereto, and the service provider server 500 may generate execution authorization information in various ways.

In an operation S460, the service provider server 500 may request the cloud server 100 to register generated execution authorization information. For example, the service provider server 500 may transmit access information received from the user device 400 and a generated authentication key to the cloud server 100 and request the cloud server 100 to register the authentication key.

In an operation S470, the cloud server 100 may determine whether to register received execution authorization information. For example, the cloud server 100 may determine whether to register a received authentication key based on received access information. For example, if an access key received together with the authentication key is identical to an authentication key generated by the cloud server 100, the cloud server 100 may register the authentication key.

In case of registering execution authorization information, the cloud server 100 may set an execution authorization for performing at least one function provided by the first device 200. For example, in case of registering execution authorization information, the cloud server 100 may set an execution authorization for performing a first function from among registered functions of the first device 200 for one time to the execution authorization information. Furthermore, in case of registering execution authorization information, the cloud server 100 may set an execution authorization for performing a second function from among registered functions of the first device 200 for two times to the execution authorization information. However, the inventive concept is not limited thereto, and the cloud server 100 may set various types of execution authorizations to execution authorization information.

In case of registering execution authorization information, the cloud server 100 may set an execution authorization for performing a registered function of the first device 200 to the execution authorization information based on access information received together with the execution authorization information.

For example, if the cloud server 100 registers a received authentication key, the cloud server 100 may register a first function from among functions provided by the first device 200, which is indicated by access information received together with the authentication key, for one time to the received authentication key.

FIGS. 5A and 5B are diagrams illustrating execution authorization information registered to a cloud server according to various embodiments of the present disclosure.

Referring to FIG. 5A, the cloud server 100 may possess access information. For example, the cloud server 100 may generate and possess an access key, which is a form of access information.

A device 510 of FIG. 5A refers to the first device 200 registered to the cloud server 100. The cloud server 100 may register a plurality of first devices 200.

A function 520 refers to a function of the first device 200 registered to the cloud server 100. The cloud server 100 may register at least one function provided by each of the plurality of first devices 200.

An access key 530 refers to an example of access information stored in the cloud server 100. The cloud server 100 may generate the access key 530 based on a request of an administrator of the first device 200. The cloud server 100 may generate and possess different access keys with respect to respective functions provided by the first device 200. Furthermore, even if a same function provided by the first device 200 may be performed for different numbers of times 540 by using different access keys, the cloud server 100 may generate and possess different access keys.

Referring to FIG. 5B, the cloud server 100 may possess execution authorization information. For example, the cloud server 100 may possess execution authorization information in the form of an authentication key 545.

The cloud server 100 may register execution authorization information. For example, the cloud server 100 may register execution authorization information based on access information received together with the execution authorization information.

In case of registering execution authorization information, the cloud server 100 may set execution authorization regarding at least one function provided by the first device 200 to the execution authorization information. For example, the cloud server 100 may set a function, a number of times, or a combination thereof to each of authentication keys 545.

The cloud server 100 may set an authorization for performing a registered function of the first device 200 to an authentication key based on access information received together with execution authorization information. For example, if access information received by the cloud server 100 indicates execution of a first function from among functions provided by the first device 200 for one time, the cloud server 100 may set an authorization for performing the first function from among functions provided by the first device 200 for one time to an authentication key received together with the access information.

Figure 6:
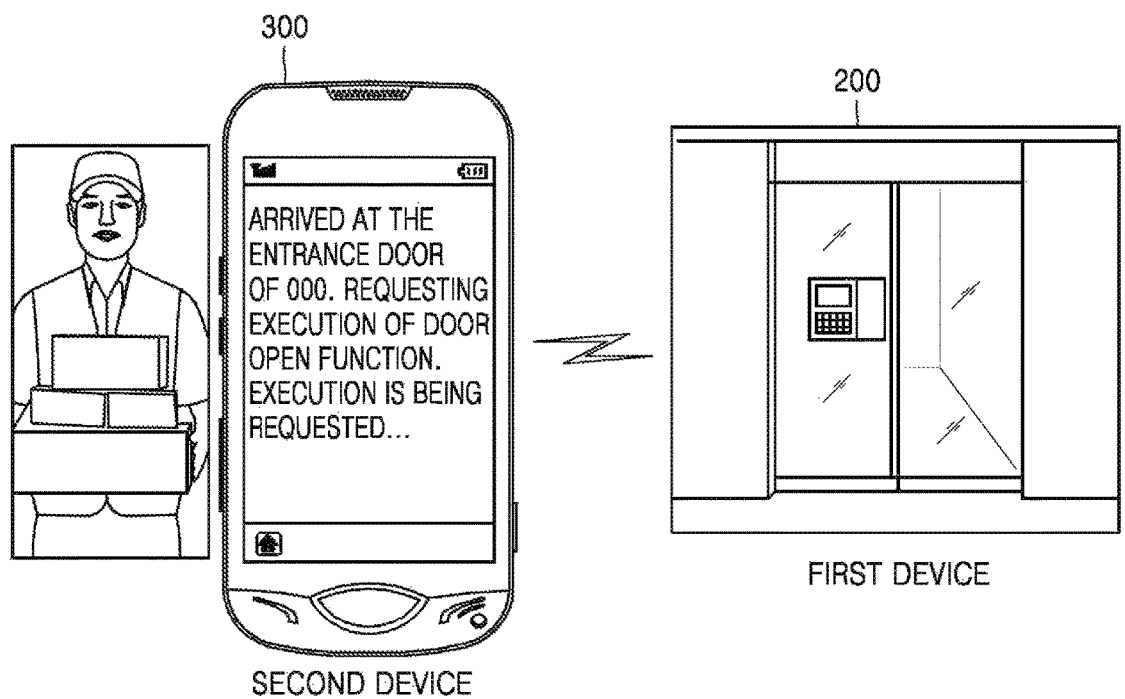
FIG. 6 is a diagram illustrating a method whereby a second device requests a first device to perform at least one function provided by the first device according to an embodiment of the present disclosure.

FIG. 6 is a diagram illustrating a method whereby a second device requests a first device to perform at least one function provided by the first device according to an embodiment of the present disclosure.

Referring to FIG. 6, the second device 300 that supports a service requested by an administrator of the first device 200 may search for the first device 200. Furthermore, the second device 300 may be connected to the found first device 200 through a network.

The second device 300 may request the first device 200 through a network to perform a function provided by the first device 200. For example, the second device 300 may detect a function used for a service requested by the administrator of the first device 200 from among at least one or more functions provided by the first device 200. Furthermore, the second device 300 may request the first device 200 to perform the detected function.

For example, referring to FIG. 6, the second device 300 of a parcel delivery service provider may search for a digital door lock, which is the first device 200. Furthermore, the second device 300 may search for door open function used for parcel delivery service requested by the administrator of the first device 200 from among functions provided by the digital door lock and request execution of the found door open function.

When the second device 300 requests execution of a function provided by the first device 200, the second device 300 may transmit authentication information regarding the second device 300 to the first device 200.

For example, the second device 300 may transmit identification information regarding the second device 300, an authentication key possessed by the second device 300, information regarding location of the second device 300, a manufacturer's serial number of the second device 300, identification information regarding services provided by the second device 300, or a combination thereof to the first device 200. However, the inventive concept is not limited thereto.

Figure 7:
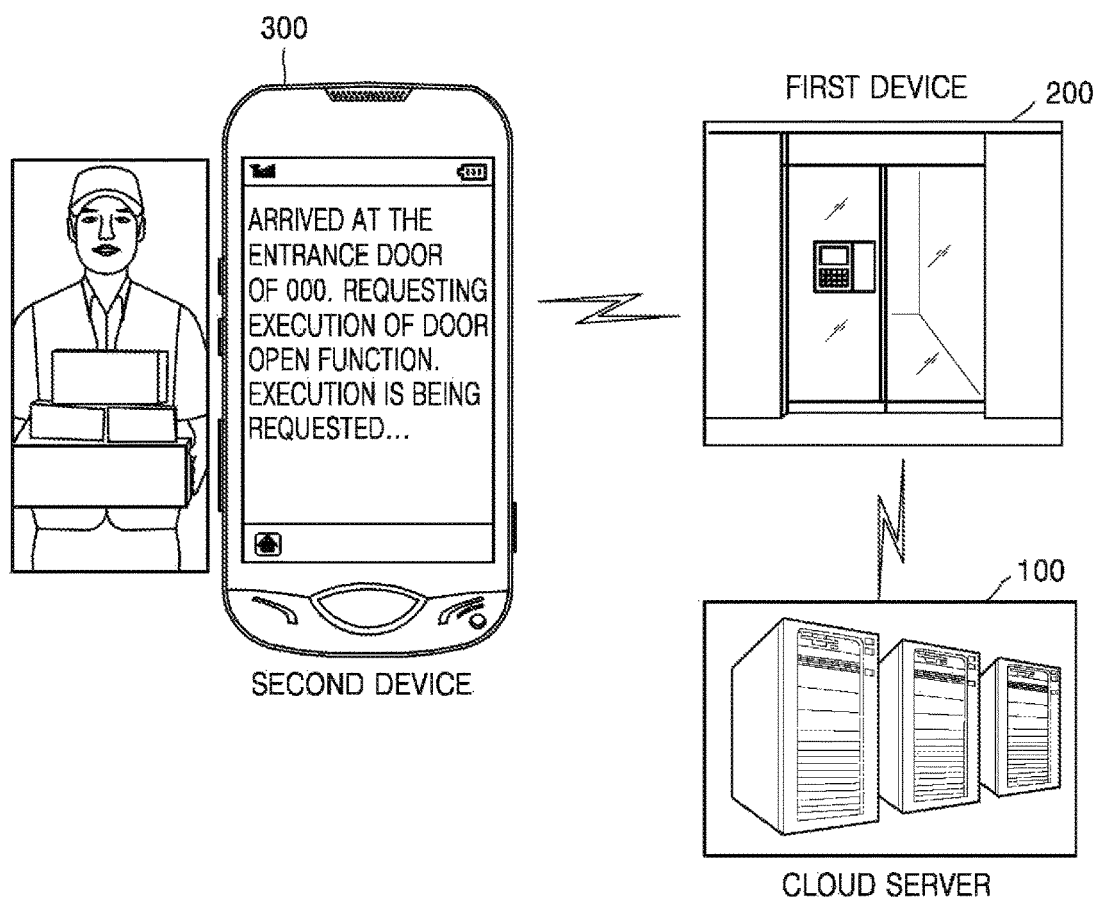
FIG. 7 is a diagram illustrating a method that a first device requests a cloud server to authenticate a second device according to an embodiment of the present disclosure.

FIG. 7 is a diagram illustrating a method whereby a first device requests a cloud server to authenticate a second device according to an embodiment of the present disclosure.

Referring to FIG. 7, the first device 200 may request authentication of the second device 300 to the cloud server 100 based on a request for performing a function of the first device 200 received from the second device 300.

For example, referring to FIG. 7, a digital door lock, which is the first device 200, may request the cloud server 100 to authenticate the second device 300 based on a request to perform a door open function received from the second device 300 of a parcel delivery service provider.

Furthermore, the first device 200 may transmit authentication information regarding the second device 300 received from the second device 300 to the cloud server 100 together with a request for authenticating the second device 300 received from the second device 300. For example, the first device 200 may transmit identification information regarding the second device 300, an authentication key possessed by the second device 300, information regarding location of the second device 300, a manufacturer's serial number of the second device 300, identification information regarding services provided by the second device 300, or a combination thereof to the cloud server 100. However, the inventive concept is not limited thereto.

The first device 200 may receive a result of authenticating the second device 300 from the cloud server 100. Furthermore, the first device 200 may perform a function of the first device 200 requested by the second device 300 based on the result of authentication received from the cloud server 100.

Figure 8:
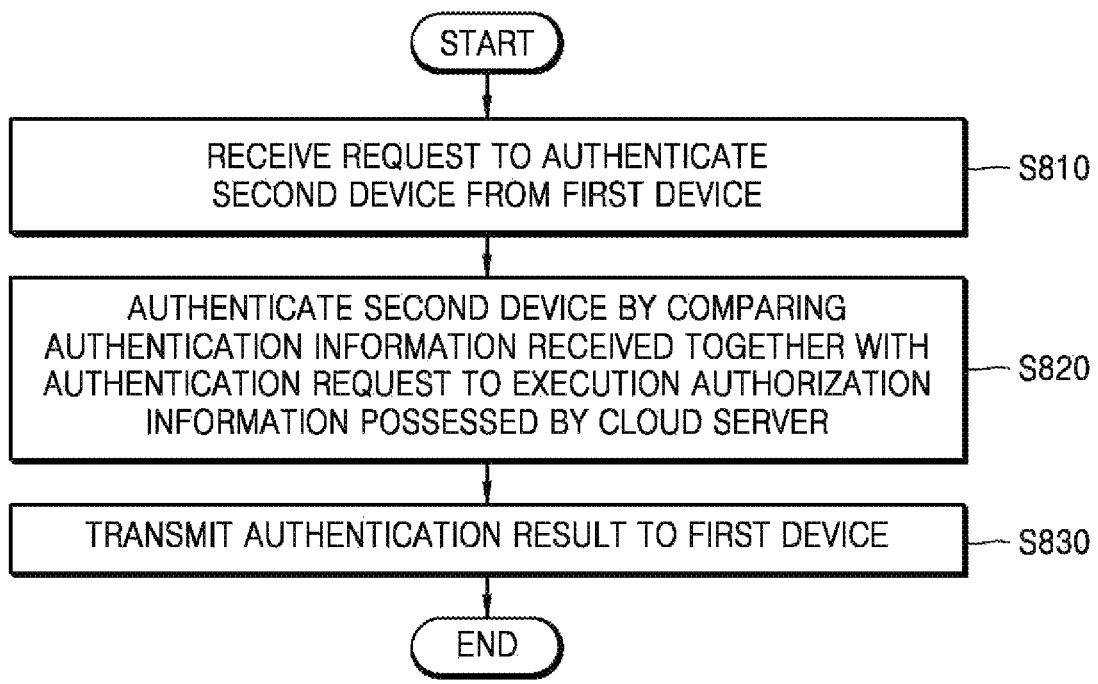
FIG. 8 is a flowchart illustrating a method whereby a cloud server authenticates a second device based on an authentication request received from a first device according to an embodiment of the present disclosure.

FIG. 8 is a flowchart illustrating a method whereby a cloud server authenticates a second device based on an authentication request received from a first device according to an embodiment of the present disclosure.

Referring to FIG. 8, in an operation S810, the cloud server 100 may receive a request for authenticating the second device 300 from the first device 200. Furthermore, the first device 200 may receive authentication information regarding the second device 300 together with the request for authenticating the second device 300.

For example, the cloud server 100 may receive identification information regarding the second device 300, an authentication key possessed by the second device 300, information regarding location of the second device 300, a manufacturer's serial number of the second device 300, identification information regarding services provided by the second device 300, or a combination thereof from the first device 200. However, the inventive concept is not limited thereto.

In an operation S820, the cloud server 100 may authenticate the second device 300 by comparing received authentication information to execution authorization information possessed by the cloud server 100. For example, if received authentication information regarding the second device 300 includes a first authentication key, the cloud server 100 may search for a first authentication key in registered execution authorization information. Furthermore, the cloud server 100 may authenticate the second device 300 based on an authorization set with respect to the found first authentication key. Specifically, the cloud server 100 may determine whether the second device 300 has authorization to perform a function of the first device 200 that the second device 300 requested to perform.

Furthermore, if the received authentication information regarding the second device 300 includes identification information regarding the second device 300, the cloud server 100 may search for identification information regarding the second device 300 in registered execution authorization information. Furthermore, the cloud server 100 may authenticate the second device 300 based on an authorization set with respect to the found identification information regarding the second device 300. Specifically, the cloud server 100 may determine whether the second device 300 has authorization to perform a function of the first device 200 that the second device 300 requested to perform.

In an operation S830, the cloud server 100 may transmit a result of authentication to the first device 200. For example, the cloud server 100 may transmit a result of authentication indicating that authentication of the second device 300 is successful. Furthermore, the cloud server 100 may also transmit a result of authentication indicating that authentication of the second device 300 is not successful.

Figure 9:
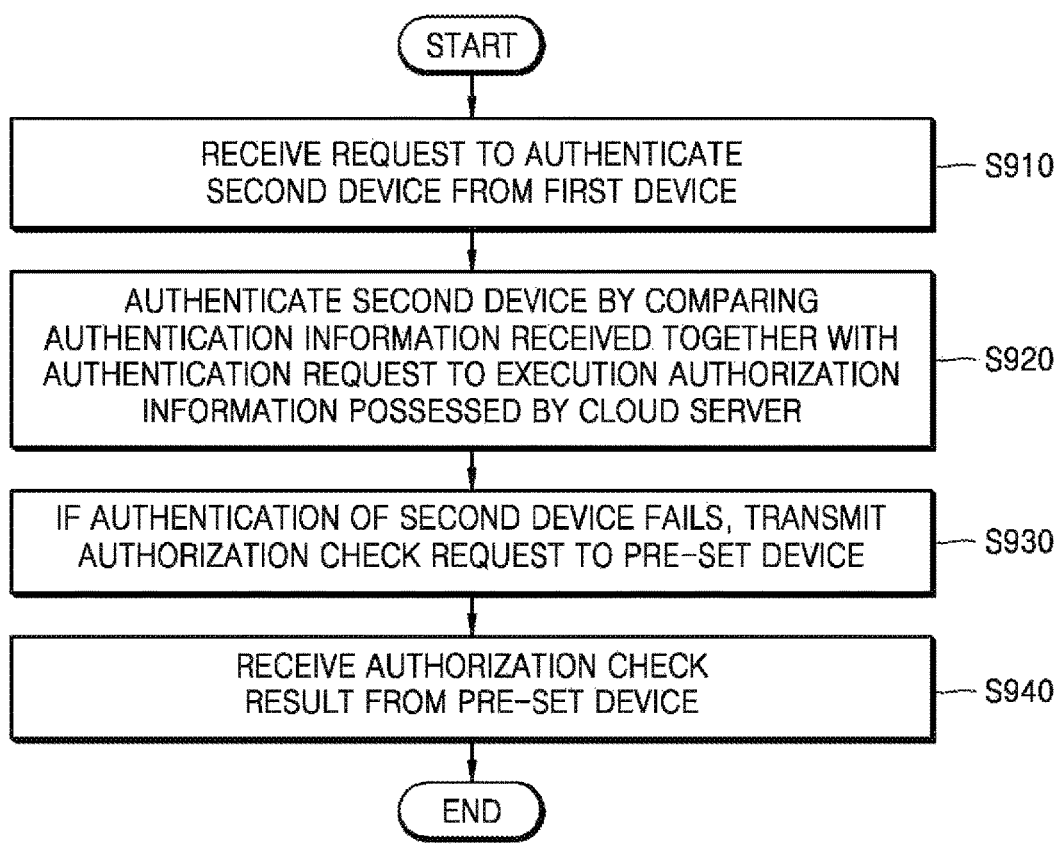
FIG. 9 is a flowchart illustrating a method whereby a cloud server authenticates a second device based on an authentication request received from a first device according to an embodiment of the present disclosure.

FIG. 9 is a flowchart illustrating a method whereby a cloud server authenticates a second device based on an authentication request received from a first device according to an embodiment of the present disclosure.

Referring to FIG. 9, in an operation S910, the cloud server 100 may receive a request for authenticating the second device 300 from the first device 200. Detailed description thereof is given above with reference to the operation S810 of FIG. 8.

In an operation S920, the cloud server 100 may authenticate the second device 300 by comparing received authentication information to execution authorization information possessed by the cloud server 100. Detailed description thereof is given above with reference to the operation S820 of FIG. 8.

In an operation S930, if authentication of the second device 300 is not successful, the cloud server 100 may transmit an authentication determination request to a pre-set device.

If authentication information regarding the second device 300 received by the cloud server 100 includes a first authentication key, the cloud server 100 may search for a first authentication key in registered execution authorization information. If the cloud server 100 fails to find a first authentication key in the registered execution authorization information, the cloud server 100 may fail to authenticate the second device 300.

If the cloud server 100 fails to authenticate the second device 300, the cloud server 100 may transmit an authorization determination request to a pre-set device. The cloud server 100 may transmit an authorization determination request in any of various forms. For example, an authorization determination request may be transmitted in the form of a text message or a video message.

The pre-set device may include the user device 400. Furthermore, the pre-set device may include a device having authorization to manage the first device 200 and the cloud server 100. However, the inventive concept is not limited thereto.

In an operation S940, the cloud server 100 may receive an authorization determination result from the pre-set device.

The pre-set device may determine whether the second device 300 has authorization to perform a function of the first device 200 that the second device 300 requested to perform. For example, the pre-set device may determine the authorization of the second device 300 based on a user input. Furthermore, the pre-set device may determine the authorization of the second device 300 based on authentication information regarding the second device 300. However, the inventive concept is not limited thereto, and the pre-set device may determine whether the second device 300 has authorization to perform a function of the first device 200 that the second device 300 requested to perform in various ways.

The cloud server 100 may receive an authorization determination result from the pre-set device. Furthermore, the cloud server 100 may transmit a result of authenticating the second device 300 based on the received authorization determination result to the first device 200.

Figure 10:
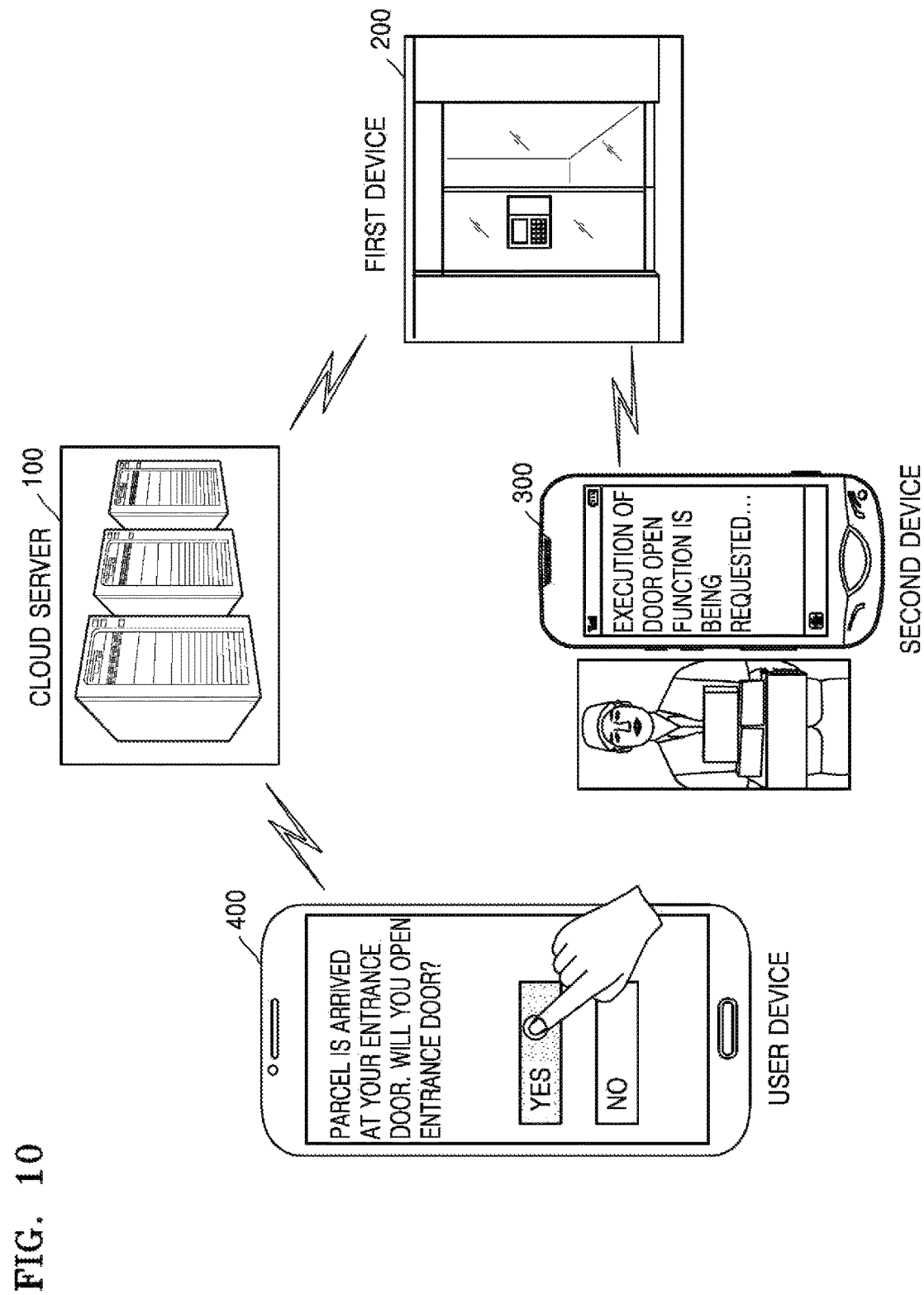
FIG. 10 is a diagram illustrating a method whereby a cloud server requests a pre-set device to determine an authorization of a second device according to an embodiment of the present disclosure.

FIG. 10 is a diagram illustrating a method whereby a cloud server requests a pre-set device to determine authorization of a second device according to an embodiment of the present disclosure.

Referring to FIG. 10, the cloud server 100 may receive a request for authenticating the second device 300 from the first device 200. Furthermore, the cloud server 100 may receive authentication information regarding the second device 300 together with the request for authenticating the second device 300.

For example, the cloud server 100 may receive identification information regarding the second device 300, an authentication key possessed by the second device 300, information regarding a location of the second device 300, a manufacturer's serial number of the second device 300, identification information regarding services supported by the second device 300, or a combination thereof from the first device 200. However, the inventive concept is not limited thereto.

The cloud server 100 may request the pre-set device to determine whether the second device 300 has authorization to perform a function of the first device 200 that the second device 300 requested to execute, based on the request for authenticating the second device 300 received from the first device 200. For example, if authentication of the second device 300 fails, the cloud server 100 may request the pre-set device to determine the authorization of the second device 300.

The cloud server 100 may request the pre-set device to determine the authorization of the second device 300 when the cloud server 100 transmits authentication information regarding the second device 300, which is received from the first device 200 together with a request for authenticating the second device 300, to the pre-set device.

Based on the received authorization determination request, the pre-set device may display a screen image for receiving an input regarding an authorization of the second device 300 on a display screen of the pre-set device. For example, if a user requests parcel delivery service, the second device 300 of a parcel delivery service provider may request a digital door lock, which is the first device 200, to perform a door open function. The first device 200 may request the cloud server 100 to authenticate the second device 300 based on the received execution request. The cloud server 100 may request the user device 400 to determine an authorization of the second device 300 based on the received request for authenticating the second device 300. The user device 400 may display an interface for receiving an input of a user on a display screen of the user device 400 based on the received authorization determination request.

Referring to FIG. 10, the pre-set device may authenticate an authorization of the second device 300 based on an input of a user. For example, the user device 400 may authenticate an authorization of the second device 300 by obtaining an input of a user through an interface displayed on the display screen of the user device 400.

Figure 11:
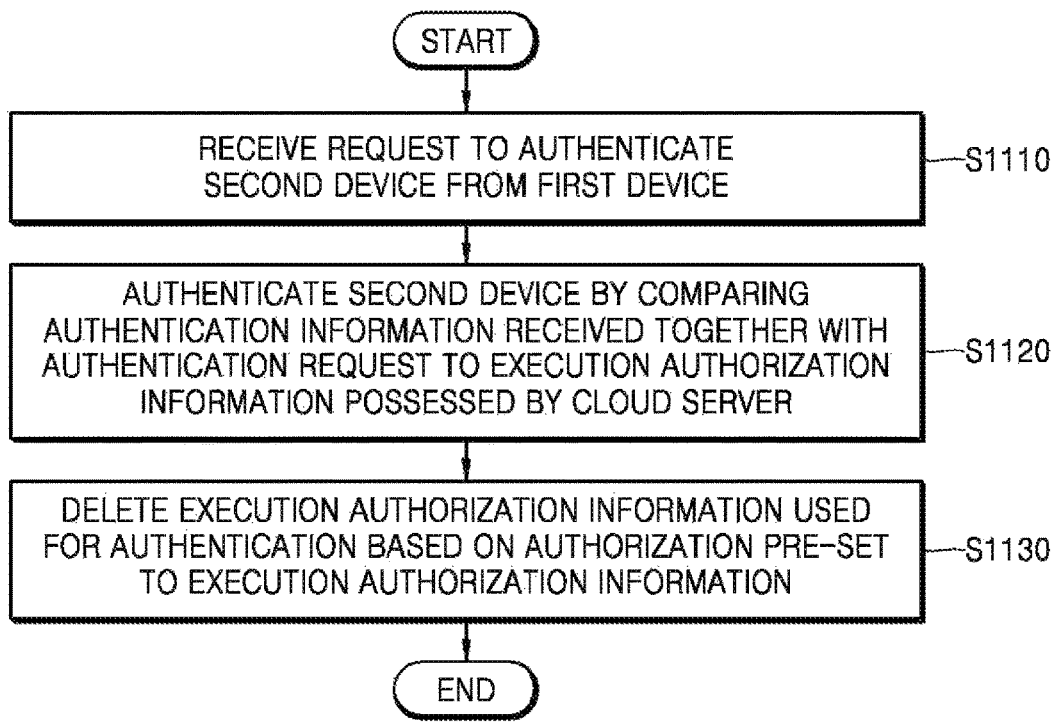
FIG. 11 is a diagram illustrating a method whereby a cloud server deletes execution authorization information after authenticating an authorization of a second device according to an embodiment of the present disclosure.

FIG. 11 is a diagram illustrating a method whereby a cloud server deletes execution authorization information after authenticating an authorization of a second device according to an embodiment of the present disclosure.

Referring to FIG. 11, in an operation S1110, the cloud server 100 may receive a request for authenticating the second device 300. Detailed description thereof is given above with reference to the operation S810 of FIG. 8.

In an operation S1120, the cloud server 100 may authenticate the second device 300 by comparing received authentication information to execution authorization information possessed by the cloud server 100. For example, if received authentication information regarding the second device 300 includes a first authentication key, the cloud server 100 may search for a first authentication key in registered execution authorization information. Furthermore, the cloud server 100 may authenticate the second device 300 based on an authorization set to the found first authentication key. Specifically, the cloud server 100 may determine whether the second device 300 has an authorization for performing a function of the first device 200 that the second device 300 requested to perform.

Furthermore, if the received authentication information regarding the second device 300 includes identification information regarding the second device 300, the cloud server 100 may search for identification information regarding the second device 300 in registered execution authorization information. Furthermore, the cloud server 100 may authenticate the second device 300 based on an authorization set to the found identification information regarding the second device 300. Specifically, the cloud server 100 may determine whether the second device 300 has an authorization for performing a function of the first device 200 that the second device 300 requested to perform.

In an operation S1130, the cloud server 100 may determine whether to delete execution authorization information used for authenticating the second device 300 based on an authorization pre-set to the execution authorization information.

For example, if a number of time set to a first authentication key is 'one time,' the cloud server 100 may delete a registered first authentication key after using the registered first authentication key for authenticating the second device 300. As a result, if authentication information regarding the second device 300 received by the cloud server 100 later includes the first authentication key, the cloud server 100 may fail to authenticate the second device 300.

Furthermore, if a number of time set to identification information regarding the second device 300 is 'one time,' the cloud server 100 may delete the registered identification information regarding the second device 300 for authenticating the second device 300 after using the registered identification information regarding the second device 300. As a result, if authentication information regarding the second device 300 received by the cloud server 100 later includes the identification information regarding the second device 300, the cloud server 100 may fail to authenticate the second device 300.

Figure 12:
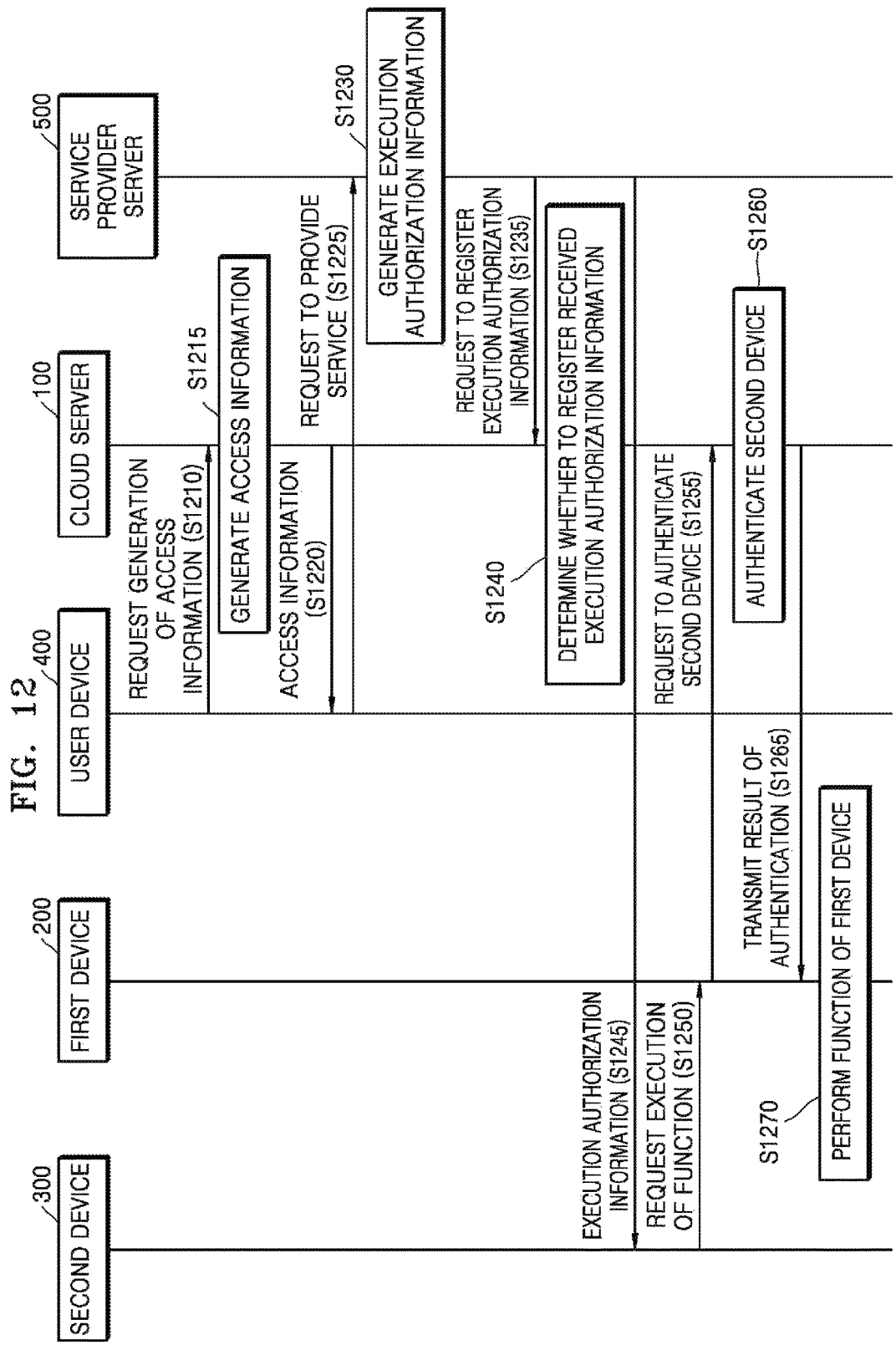
FIG. 12 is a flowchart illustrating a method whereby a user requests a service and a service provider provides the service according to an embodiment of the present disclosure.

FIG. 12 is a flowchart illustrating a method whereby a user requests a service and a service provider provides the service according to an embodiment of the present disclosure.

Referring to FIG. 12, in an operation S1210, the user device 400 may request the cloud server 100 to generate access information.

In an operation S1215, the cloud server 100 may generate access information. For example, the cloud server 100 may generate access information by using identification information regarding the user device 400 and a hash function. However, the inventive concept is not limited thereto, and the cloud server 100 may generate access information in various ways.

In an operation S1220, the user device 400 may receive access information from the cloud server 100. For example, the user device 400 may receive access information from the cloud server 100 through a network.

In an operation S1225, the user device 400 may request the service provider server 500 to provide a service. For example, the user device 400 may receive an input of a user and request parcel delivery service. Furthermore, the user device 400 may transmit access information regarding the cloud server 100 when the user device 400 requests the parcel delivery service.

In an operation S1230, the service provider server 500 may generate execution authorization information regarding the first device 200. For example, the service provider server 500 may generate an authentication key by using a service reception number or an arbitrary random number. However, the inventive concept is not limited thereto, and the service provider server 500 may generate execution authorization information in various ways.

In an operation S1235, the service provider server 500 may request the cloud server 100 to register generated execution authorization information. For example, the service provider server 500 may transmit access information received from the user device 400 and a generated authentication key to the cloud server 100 and request the cloud server 100 to register the authentication key.

In an operation S1240, the cloud server 100 may determine whether to register received execution authorization information. For example, the cloud server 100 may determine whether to register a received authentication key based on received access information. For example, if an access key received together with an authentication key is identical to an access key possessed by the cloud server 100, the cloud server 100 may register the authentication key.

In case of registering execution authorization information, the cloud server 100 may set an execution authorization for performing at least one function provided by the first device 200 to the execution authorization information. For example, in case of registering execution authorization information, the cloud server 100 may set an execution authorization for performing a first function from among registered functions of the first device 200 for one time to the execution authorization information. Furthermore, in case of registering execution authorization information, the cloud server 100 may set an execution authorization for performing a second function from among registered functions of the first device 200 for two times to the execution authorization information.

The cloud server 100 may set an authorization for performing a registered function of the first device 200 to execution authorization information based on access information received together with the execution authorization information. For example, if access information received by the cloud server 100 indicates execution of a first function from among functions provided by the first device 200 for one time, the cloud server 100 may set an authorization for performing the first function from among functions provided by the first device 200 for one time to an authentication key received together with the access information.

In an operation S1245, the service provider server 500 may transmit execution authorization information regarding the first device 200 generated by the service provider server 500 to the second device 300. For example, the service provider server 500 may transmit a generated authentication key to the second device 300.

In an operation S1250, the second device 300 may request the first device 200 through a network to perform a function provided by the first device 200. For example, the second device 300 may select one of at least one or more functions provided by the first device 200 and request to perform the selected function.

For example, if a user requests parcel delivery service, a wearable device of a parcel delivery service provider may request a digital door lock to perform a door open function that is registered to the cloud server 100.

The second device 300 may transmit authentication information regarding the second device 300 to the first device 200 when the second device 300 requests the first device 200 to perform a function provided by the first device 200.

For example, if a user requests parcel delivery service, a wearable device of a parcel delivery service provider requests a digital door lock to perform a door open function that is registered to the cloud server 100 and transmit identification information regarding the wearable device, an authentication key possessed by the wearable device, information regarding a location of the wearable device, a manufacturer's serial number of the wearable device, identification information regarding services supported by the wearable device, or a combination thereof to the digital door lock.

In an operation S1255, as the second device 300 of a service provider, which is capable of providing a service, requests execution of the first device 200, the first device 200 may request the cloud server 100 to authenticate the second device 300.

For example, if a user requests parcel delivery service, as a wearable device of the parcel delivery service provider requests execution of door open function of a digital door lock registered to the cloud server 100, the digital door lock may request the cloud server 100 to authenticate the wearable device of the parcel delivery service provider.

The first device 200 may transmit authentication information regarding the second device 300 together with the authentication request. For example, the first device 200 may transmit identification information regarding the second device 300, an authentication key possessed by the second device 300, information regarding a location of the second device 300, a manufacturer's serial number of the second device 300, identification information regarding services supported by the second device 300, or a combination thereof to the cloud server 100 together with a request for authenticating the second device 300.

In an operation S1260, the cloud server 100 may perform authentication regarding the second device 300 based on the authentication request from the first device 200.

The cloud server 100 may perform authentication regarding the second device 300 based on the authentication request received from the first device 200.

For example, the cloud server 100 may perform authentication for determining whether the second device 300 has an authorization to perform a function provided by the first device 200 by using authentication information regarding the second device 300 included in the authentication request.

The cloud server 100 may perform authentication regarding the second device 300 by using registered execution authorization information. For example, the cloud server 100 may authenticate the second device 300 by comparing information included in authentication information regarding the second device 300 received from the first device 200 to registered execution authorization information.

For example, if a first authentication key is included in received authentication information regarding the second device 300, the cloud server 100 may search for a first authentication key in registered execution authorization information. Furthermore, the cloud server 100 may authenticate the second device 300 based on an authorization set to the found first authentication key. If an authorization for performing a function of the first device 200 that the second device 300 requested to perform is set to the found first authentication key, the cloud server 100 may successfully authenticate the second device 300. In other words, the cloud server 100 may determine that the second device 300 has an authorization for performing a function of the first device 200 that the second device 300 requested to perform.

Furthermore, if identification information regarding the second device 300 is included in authentication information regarding the second device 300 received by the cloud server 100, the cloud server 100 may search for identification information regarding the second device 300 in registered execution authorization information. Furthermore, the cloud server 100 may authenticate the second device 300 based on an authorization set to the found identification information regarding the second device 300. If an authorization for performing a function of the first device 200 that the second device 300 requested to perform is set to the found identification information regarding the second device 300, the cloud server 100 may successfully authenticate the second device 300. In other words, the cloud server 100 may determine that the second device 300 has an authorization for performing a function of the first device 200 that the second device 300 requested to perform.

If it is determined that the second device 300 does not have an authorization for performing a function provided by the first device 200, the cloud server 100 may request the pre-set user device 400 to determine an authorization of the second device 300. For example, the cloud server 100 may request to determine an authorization of the second device 300 in the form of a text message or a video message. However, the inventive concept is not limited thereto.

Based on the received authorization determination request regarding the second device 300, the user device 400 may determine whether the second device 300 has an authorization to perform at least one function provided by the first device 200. For example, the user device 400 may determine an authorization of the second device 300 based on an input of a user. Furthermore, the user device 400 may determine an authorization of the second device 300 by using authentication information regarding the second device 300 that is received together with the authorization determination request. However, the inventive concept is not limited thereto.

The cloud server 100 may receive an authorization determination result from the user device 400. Furthermore, based on the authorization determination result, the cloud server 100 may obtain a result of authenticating the second device 300.

In an operation S1265, the cloud server 100 may transmit a result of the authentication to the first device 200.

The cloud server 100 may transmit a result of authenticating the second device 300 to the first device 200. For example, the cloud server 100 may transmit a result of authentication obtained based on an authentication performed by the cloud server 100 or transmit a result of authentication obtained based on an authorization determination result received from the user device 400.

In an operation S1265, the first device 200 may perform a function of the first device 200 based on a result of authentication received from the cloud server 100. For example, if it is determined by the cloud server 100 that the second device 300 has an authorization to perform a function requested by the second device 300, the first device 200 may perform the function requested by the second device 300 from among at least one or more function provided by the first device 200 in an operation S1270.

Figure 13:
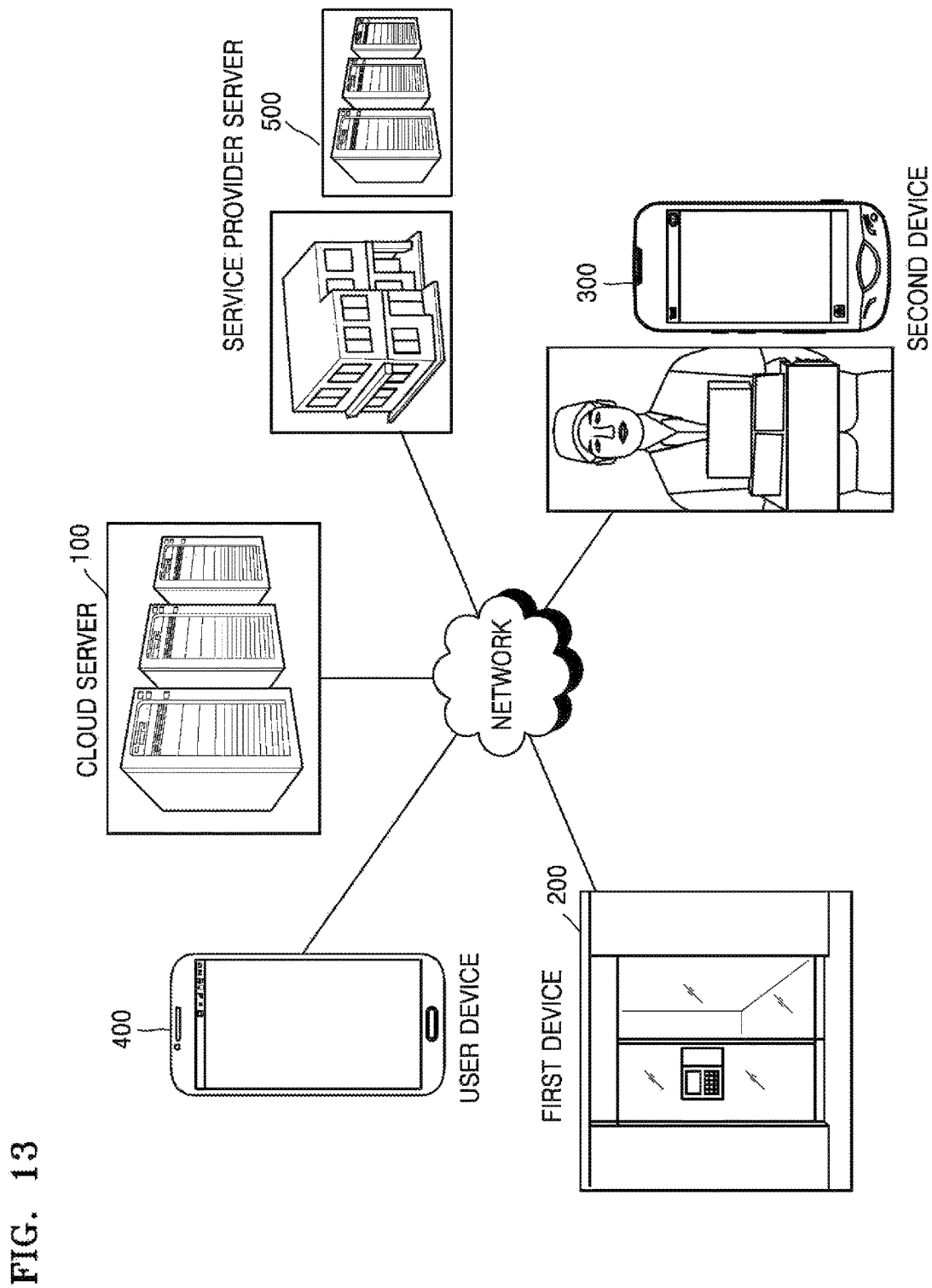
FIG. 13 is a diagram illustrating a method whereby a user requests a service and a service provider provides the service according to an embodiment of the present disclosure.

FIG. 13 is a diagram illustrating a method whereby a user requests a service and a service provider provides the service according to an embodiment of the present disclosure.

Referring to FIG. 13, the user device 400 may request the cloud server 100 to generate access information.

The user device 400 may receive access information from the cloud server 100. For example, the user device 400 may receive access information from the cloud server 100 through a network.

The user device 400 may request parcel delivery service to a parcel delivery service provider. For example, the user device 400 may receive an input of a user and request the parcel delivery service to a parcel delivery service provider server 500 of the parcel delivery service provider.

The parcel delivery service provider server 500 may generate execution authorization information regarding the first device 200. For example, the parcel delivery service provider server 500 may generate an authentication key by using a service reception number or an arbitrary random number. However, the inventive concept is not limited thereto, and the parcel delivery service provider server 500 may generate execution authorization information in various ways.

The parcel delivery service provider server 500 may request the cloud server 100 to register the generated execution authorization information. For example, the parcel delivery service provider server 500 may transmit access information received from the user device 400 and a generated authentication key to the cloud server 100 and request the cloud server 100 to register the authentication key.

The cloud server 100 may determine whether to register received execution authorization information. For example, the cloud server 100 may determine whether to register a received authentication key based on received access information.

The cloud server 100 may set an execution authorization for performing at least one function provided by the first device 200 to registered execution authorization information. For example, the cloud server 100 may set an execution authorization for performing a first function from among registered functions of the first device 200 for one time to execution authorization information. Furthermore, the cloud server 100 may set an execution authorization for performing a second function from among registered functions of the first device 200 for two times to execution authorization information. However, the inventive concept is not limited thereto, and the cloud server 100 may set an execution authorization for performing at least one function provided by the first device 200 to registered execution authorization information in various ways.

The cloud server 100 may set an authorization for performing a registered function of the first device 200 to execution authorization information based on access information received together with the execution authorization information. For example, if access information received by the cloud server 100 indicates execution of a first function from among functions provided by the first device 200 for one time, the cloud server 100 may set an authorization for performing the first function from among functions provided by the first device 200 for one time to an authentication key received together with the access information.

The parcel delivery service provider server 500 may transmit generated execution authorization information regarding the first device 200 to a wearable device of the parcel delivery service provider, which is the second device 300.

The second device 300 may approach to the first device 200. Furthermore, the second device 300 may be connected to the first device 200. For example, if the second device 300 is located within a critical distance from the first device 200, the second device 300 may be connected to the first device 200.

When the second device 300 of the parcel delivery service provider approaches to the first device 200, the second device 300 may be connected to the first device 200. Furthermore, the second device 300 of the parcel delivery service provider may request door open function of the first device 200 registered to the cloud server 100.

When the second device 300 of the parcel delivery service provider requests execution of the door open function of the first device 200 registered to the cloud server 100, the second device 300 may transmit identification information regarding the second device 300, an authentication key possessed by the second device 300, information regarding a location of the second device 300, a manufacturer's serial number of the second device 300, identification information regarding services supported by the second device 300, or a combination thereof to the cloud server 100.

As the second device 300 of the parcel delivery service provider requests execution of the door open function of the digital door lock 200 registered to the cloud server 100, the digital door lock 200 may request the cloud server 100 to authenticate the second device 300 of the parcel delivery service provider.

The digital door lock 200 may transmit authentication information regarding the second device 300 together with an authentication request. For example, the digital door lock 200 may transmit identification information regarding the second device 300, an authentication key possessed by the second device 300, information regarding a location of the second device 300, a manufacturer's serial number of the second device 300, identification information regarding services supported by the second device 300, or a combination thereof, which are received from the second device 300, to the cloud server 100 together with a request for authenticating the second device 300.

The cloud server 100 may authenticate the second device 300 based on an authentication request received from the digital door lock 200.

For example, the cloud server 100 may determine whether the second device 300 has an authorization for performing the door open function provided by the digital door lock 200 by using authentication information regarding the second device 300 included in the authentication request.

The cloud server 100 may authenticate the second device 300 by using registered execution authorization information. For example, the cloud server 100 may authenticate the second device 300 by comparing information included in authentication information regarding the second device 300 received from the digital door lock 200 to registered execution authorization information.

For example, if a first authentication key is included in received authentication information regarding the second device 300, the cloud server 100 may search for a first authentication key in registered execution authorization information. Furthermore, the cloud server 100 may authenticate the second device 300 based on an authorization set to the found first authentication key. If an authorization for performing a function of the digital door lock 200 that the second device 300 requested to perform is set to the found first authentication key, the cloud server 100 may successfully authenticate the second device 300.

Furthermore, if identification information regarding the second device 300 is included in authentication information regarding the second device 300 received by the cloud server 100, the cloud server 100 may search for identification information regarding the second device 300 in registered execution authorization information. Furthermore, the cloud server 100 may authenticate the second device 300 based on an authorization set to the found identification information regarding the second device 300. If an authorization for performing the door open function provided by the digital door lock 200 is set to the found identification information regarding the second device 300, the cloud server 100 may successfully authenticate the second device 300.

If it is determined that the second device 300 does not have an authorization for performing the door open function provided by the digital door lock 200, the cloud server 100 may request the pre-set user device 400 to determine an authorization of the second device 300. For example, the cloud server 100 may request to determine an authorization of the second device 300 in the form of a text message or a video message. However, the inventive concept is not limited thereto.

Based on the received authorization determination request regarding the second device 300, the user device 400 may determine whether the second device 300 has an authorization to perform the door open function provided by the digital door lock 200. For example, the user device 400 may determine an authorization of the second device 300 based on an input of a user. Furthermore, the user device 400 may determine an authorization of the second device 300 by using authentication information regarding the second device 300 that is received together with the authorization determination request. However, the inventive concept is not limited thereto.

The cloud server 100 may receive an authorization determination result from the user device 400. Furthermore, based on the authorization determination result, the cloud server 100 may obtain a result of authenticating the second device 300.

The cloud server 100 may transmit a result of the authentication to the digital door lock 200. For example, the cloud server 100 may transmit a result of authentication obtained based on an authentication performed by the cloud server 100 or transmit a result of authentication obtained based on an authorization determination result received from the user device 400.

The digital door lock 200 may perform a function of the digital door lock 200 based on a result of authentication received from the cloud server 100. For example, the digital door lock 200 may perform the door open function from among at least one or more function provided by the digital door lock 200 based on the result of authentication.

Figure 14:
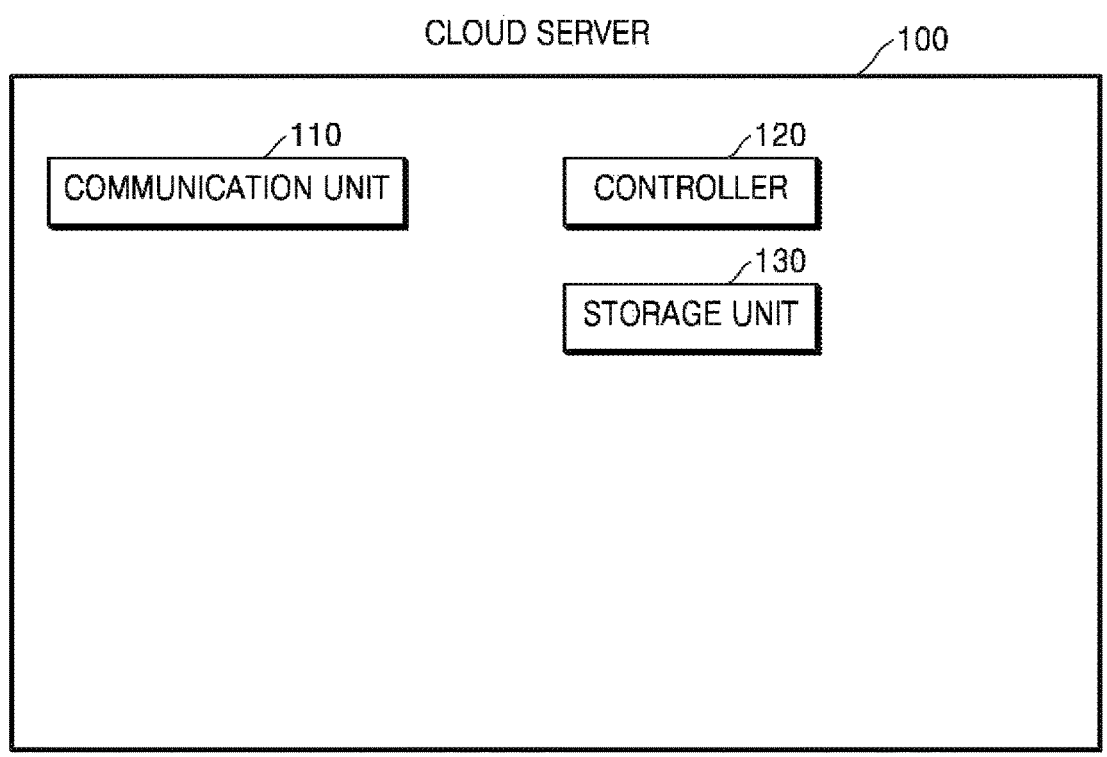
FIG. 14 is a diagram illustrating a cloud server according to an embodiment of the present disclosure.

FIG. 14 is a diagram illustrating a cloud server according to an embodiment of the present disclosure.

Referring to FIG. 14, the cloud server 100 may include a communication unit 110, a controller 120, and a storage unit 130. The communication unit 110, the controller 120, and the storage unit 130 may be embodied as a single processor. Furthermore, each of the communication unit 110, the controller 120, and the storage unit 130 may be embodied as a single processor or a plurality of processors. However, the inventive concept is not limited thereto.

The communication unit 110 of the cloud server 100 may receive execution authorization information from the user device 400. For example, the communication unit 110 of the cloud server 100 may receive execution authorization information from the user device 400 through a network.

The controller 120 of the cloud server 100 may register the execution authorization information received from the user device 400. For example, if the communication unit 110 of the cloud server 100 receives an authentication key regarding the first device 200 from the user device 400, the controller 120 of the cloud server 100 may register the authentication key and set an execution authorization for performing at least one function provided by the first device 200 to the registered authentication key based on a user-input signal received from the user device 400.

Furthermore, if the communication unit 110 of the cloud server 100 receives execution authorization information regarding the first device 200 from a device having an authorization for registering execution authorization information other than the user device 400, the controller 120 of the cloud server 100 may register the received execution authorization information.

The communication unit 110 of the cloud server 100 may be requested by the user device 400 to generate access information. For example, the communication unit 110 of the cloud server 100 may be requested by the user device 400 through a network to generate access information.

The controller 120 of the cloud server 100 may generate access information. For example, the controller 120 of the cloud server 100 may generate access information by using identification information regarding the user device 400 and a hash function. However, the inventive concept is not limited thereto, and the controller 120 of the cloud server 100 may generate access information in various ways.

The communication unit 110 of the cloud server 100 may transmit access information to the user device 400. For example, the communication unit 110 of the cloud server 100 may transmit access information to the user device 400 through a network.

The communication unit 110 of the cloud server 100 may be requested by the service provider server 500 to register execution authorization information generated by the service provider server 500. For example, the communication unit 110 of the cloud server 100 may be requested by the service provider server 500 to register an authentication key. The communication unit 110 of the cloud server 100 may receive access information and an authentication key together with a registration request.

The controller 120 of the cloud server 100 may determine whether to register received execution authorization information. For example, the controller 120 of the cloud server 100 may determine whether to register received execution authorization information based on received access information. For example, if an access key received together with an authentication key is identical to an access key generated by the cloud server 100, the controller 120 of the cloud server 100 may register the authentication key.

In case of registering an authentication key, the controller 120 of the cloud server 100 may set an execution authorization for performing at least one function provided by the first device 200. For example, the controller 120 of the cloud server 100 may set an execution authorization for performing a first function from among registered functions of the first device 200 for one time to the execution authorization information. Furthermore, the controller 120 of the cloud server 100 may set an execution authorization for performing a second function from among registered functions of the first device 200 for two times to the execution authorization information. However, the inventive concept is not limited thereto, and the controller 120 of the cloud server 100 may set various types of execution authorizations to execution authorization information.

In case of registering execution authorization information, the controller 120 of the cloud server 100 may set an execution authorization for performing a registered function of the first device 200 to the execution authorization information based on access information received together with the execution authorization information.

For example, if the controller 120 of the cloud server 100 registers a received authentication key, the controller 120 of the cloud server 100 may register a first function from among functions provided by the first device 200, which is indicated by access information received together with the authentication key, for one time to the received authentication key.

The storage unit 130 of the cloud server 100 may store data. For example, the storage unit 130 of the cloud server 100 may store information regarding registration of the first device 200, an authentication key, an access key, and information regarding an execution authorization set to the authentication key. However, the inventive concept is not limited thereto, and the storage unit 130 of the cloud server 100 may store various data.

The communication unit 110 of the cloud server 100 may receive a request for authenticating the second device 300 from the first device 200. Furthermore, the communication unit 110 of the cloud server 100 may receive authentication information regarding the second device 300 together with the request for authenticating the second device 300.

For example, the communication unit 110 of the cloud server 100 may receive identification information regarding the second device 300, an authentication key possessed by the second device 300, information regarding a location of the second device 300, a manufacturer's serial number of the second device 300, identification information regarding services supported by the second device 300, or a combination thereof from the first device 200. However, the inventive concept is not limited thereto.

The controller 120 of the cloud server 100 may authenticate the second device 300 by comparing received authentication information to execution authorization information possessed by the cloud server 100. For example, if received authentication information regarding the second device 300 includes a first authentication key, the controller 120 of the cloud server 100 may search for a first authentication key in registered execution authorization information. Furthermore, the controller 120 of the cloud server 100 may authenticate the second device 300 based on an authorization set to the found first authentication key. Specifically, the controller 120 of the cloud server 100 may determine whether the second device 300 has an authorization for performing a function of the first device 200 that the second device 300 requested to perform.

Furthermore, if the received authentication information regarding the second device 300 includes identification information regarding the second device 300, the controller 120 of the cloud server 100 may search for identification information regarding the second device 300 in registered execution authorization information. Furthermore, the controller 120 of the cloud server 100 may authenticate the second device 300 based on an authorization set to the found identification information regarding the second device 300. Specifically, the controller 120 of the cloud server 100 may determine whether the second device 300 has an authorization for performing a function of the first device 200 that the second device 300 requested to perform.

If the controller 120 of the cloud server 100 successfully authenticates the second device 300, the communication unit 110 of the cloud server 100 may transmit an authentication result indicating that authentication of the second device 300 is successful.

If the controller 120 of the cloud server 100 fails to authenticate the second device 300, the communication unit 110 of the cloud server 100 may transmit an authorization determination request to a pre-set device. The communication unit 110 of the cloud server 100 may transmit an authorization determination request in any of various forms. For example, an authorization determination request may be transmitted in the form of a text message or a video message.

The cloud server 100 may receive an authorization determination result from the pre-set device. Furthermore, the cloud server 100 may transmit a result of authenticating the second device 300 based on the received authorization determination result to the first device 200.

For example, the communication unit 110 of the cloud server 100 may transmit a result of authentication indicating that authentication of the second device 300 is successful. Furthermore, the communication unit 110 of the cloud server 100 may also transmit a result of authentication indicating that authentication of the second device 300 is not successful.

The controller 120 of the cloud server 100 may determine whether to delete execution authorization information used for authenticating the second device 300 based on an authorization pre-set to the execution authorization information.

For example, if a first authentication key stored in the storage unit 130 of the cloud server 100 is used for authenticating the second device 300 and a number of time set to the first authentication key is 'one time,' the controller 120 of the cloud server 100 may delete the first authentication key stored in the storage unit 130 of the cloud server 100. As a result, if authentication information regarding the second device 300 received by the controller 120 of the cloud server 100 later includes the first authentication key, the cloud server 100 may refuse to authenticate the second device 300.

Furthermore, if identification information regarding the second device 300 registered to the storage unit 130 of the cloud server 100 is used for authenticating the second device 300 and a number of time set to the identification information regarding the second device 300 is 'one time,' the controller 120 of the cloud server 100 may delete the registered identification information regarding the second device 300 stored in the storage unit 130 of the cloud server 100. As a result, if authentication information regarding the second device 300 received by the controller 120 of the cloud server 100 later includes the identification information regarding the second device 300, the cloud server 100 may refuse to authenticate the second device 300.

Figure 15:
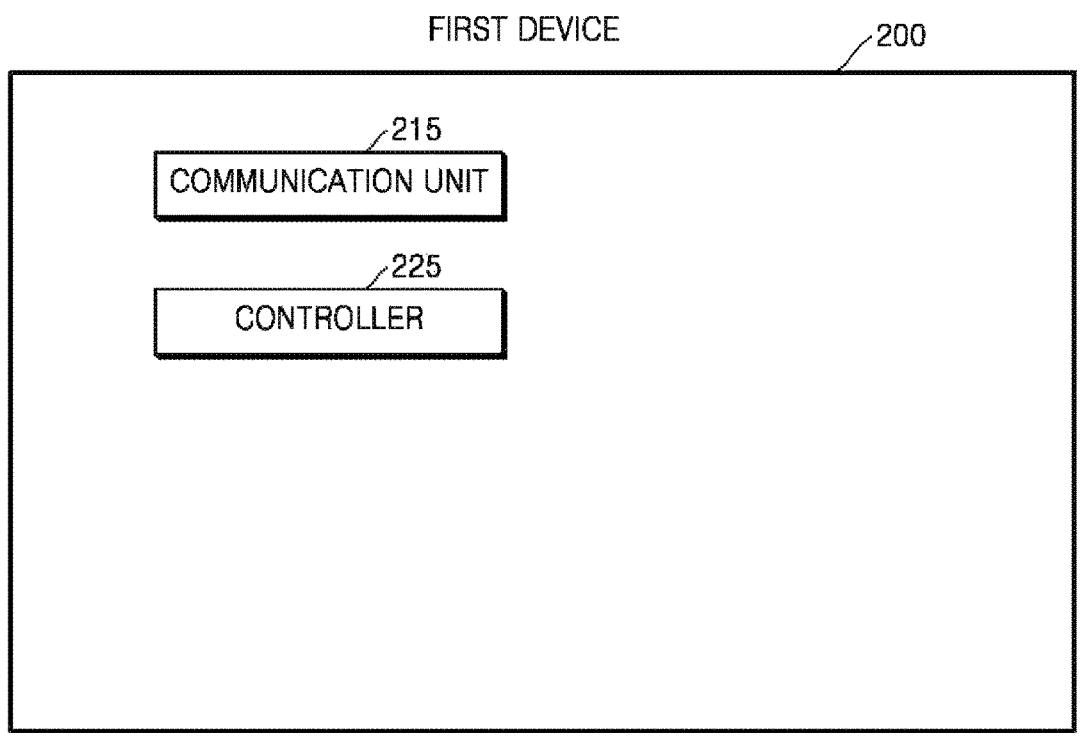
FIG. 15 is a diagram illustrating a first device according to an embodiment of the present disclosure.

FIG. 15 is a diagram illustrating a first device according to an embodiment of the present disclosure.

Referring to FIG. 15, the first device 200 may include a communication unit 215 and a controller 225. The communication unit 215 and the controller 225 may be embodied as a single processor. Alternatively, each of the communication unit 215 and the controller 225 may be embodied as a single processor or a plurality of processors. However, the inventive concept is not limited thereto.

The communication unit 215 of the first device 200 may request the cloud server 100 to register the first device 200. Furthermore, the communication unit 215 of the first device 200 may request the cloud server 100 to register at least one function provided by the first device 200.

The communication unit 215 of the first device 200 may receive a request to perform a function provided by the first device 200 from the second device 300. Furthermore, based on the received execution request, the controller 225 of the first device 200 may control the communication unit 215 of the first device 200 to request the cloud server 100 to authenticate the second device 300.

For example, based on a request for performing door open function received by the communication unit 215 of a digital door lock (the first device 200) from the second device 300 of a parcel delivery service provider, the controller 225 of the digital door lock may control the communication unit 215 to request the cloud server 100 to authenticate the second device 300.

Furthermore, the communication unit 215 of the first device 200 may transmit authentication information regarding the second device 300, which is received from the second device 300, to the cloud server 100 together with the request to authenticate the second device 300. For example, the communication unit 215 of the first device 200 may transmit identification information regarding the second device 300, an authentication key possessed by the second device 300, information regarding a location of the second device 300, a manufacturer's serial number of the second device 300, identification information regarding services supported by the second device 300, or a combination thereof to the cloud server 100. However, the inventive concept is not limited thereto.

The communication unit 215 of the first device 200 may receive a result of authenticating the second device 300 from the cloud server 100. Furthermore, based on the authentication result received from the cloud server 100, the controller 225 of the first device 200 may perform a function of the cloud server 100 that the second device 300 requested to perform.

Figure 16:
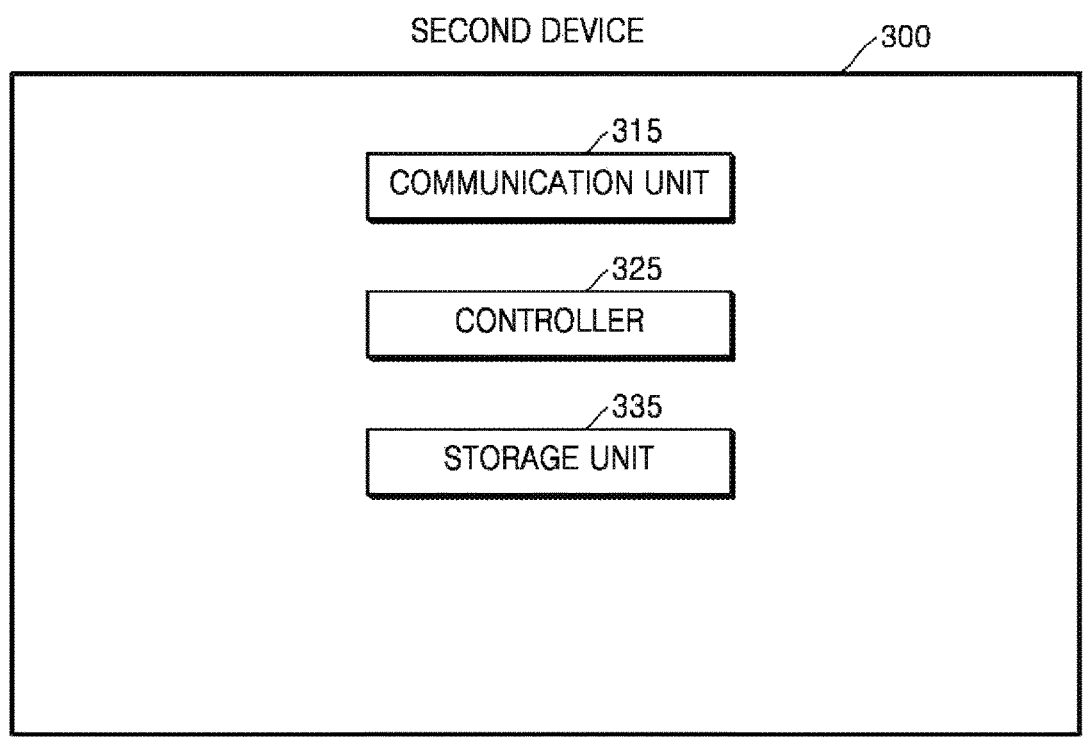
FIG. 16 is a diagram illustrating a second device according to an embodiment of the present disclosure.

FIG. 16 is a diagram illustrating a second device according to an embodiment of the present disclosure.

Referring to FIG. 16, the second device 300 may include a communication unit 315, a controller 325, and a storage unit 335. The communication unit 315, the controller 325, and the storage unit 335 of the second device 300 may be embodied as a single processor. Alternatively, each of the communication unit 315, the controller 325, and the storage unit 335 may be embodied as a single processor or a plurality of processors. However, the inventive concept is not limited thereto.

The controller 325 of the second device 300 may generate authentication information. Furthermore, the communication unit 315 of the second device 300 may receive authentication information from an external device.

For example, the communication unit 315 of the second device 300 may receive an authentication key regarding the first device 200 generated by the service provider server 500 from the service provider server 500.

The storage unit 335 of the second device 300 may store obtained authentication information. For example, the storage unit 335 of the second device 300 may store authentication information generated by the controller 325 of the second device 300 or authentication information received by the communication unit 315 of the second device 300.

The second device 300 may request the first device 200 to perform a function provided by the first device 200 through a network. For example, the controller 325 of the second device 300 may select one of at least one or more functions provided by the first device 200, and the communication unit 315 of the second device 300 may request to perform the selected function.

For example, if a user requests parcel delivery service, a controller of a wearable device of a parcel delivery service provider may search for door open function of a digital door lock registered to the cloud server 100, and a communication unit of the wearable device may request execution of the found door open function.

When the communication unit 315 of the second device 300 request execution of a function provided by the first device 200, the communication unit 315 of the second device 300 may transmit authentication information regarding the second device 300 to the first device 200.

For example, if a user requests parcel delivery service, a wearable device of a parcel delivery service provider requests a digital door lock to perform a door open function that is registered to the cloud server 100 and transmit identification information regarding the wearable device, an authentication key possessed by the wearable device, information regarding a location of the wearable device, a manufacturer's serial number of the wearable device, identification information regarding services supported by the wearable device, or a combination thereof to the digital door lock.

Figure 17:
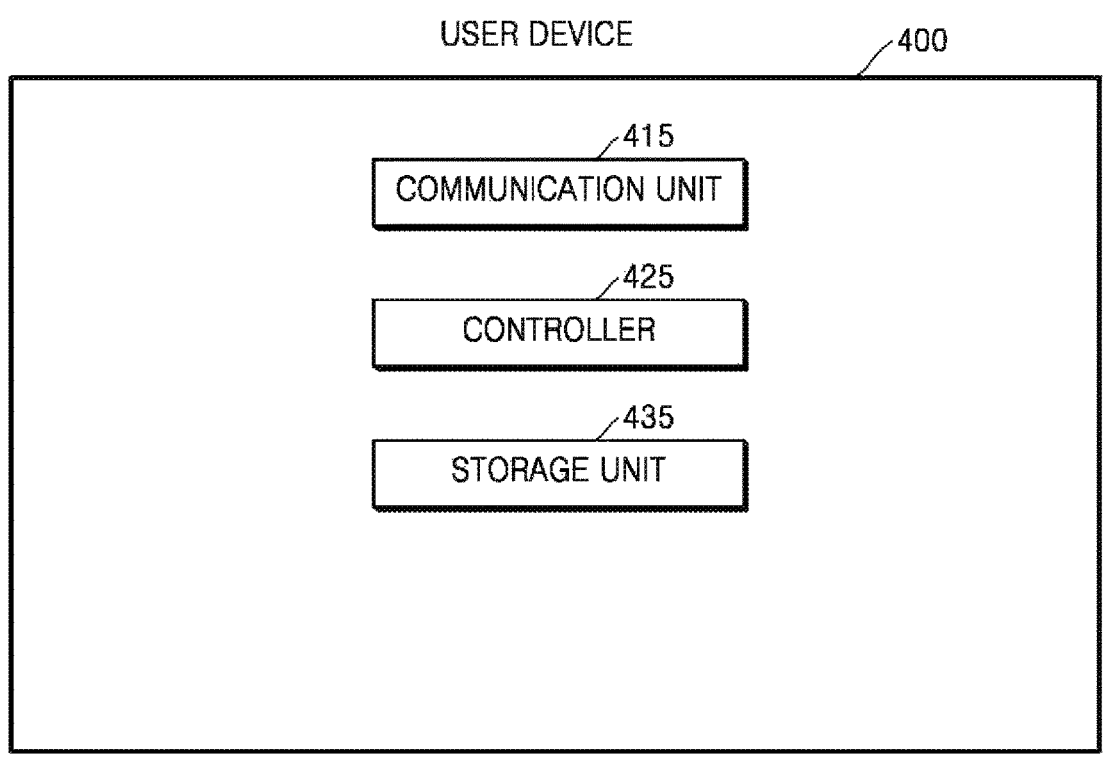
FIG. 17 is a diagram illustrating a user device according to an embodiment of the present disclosure.

FIG. 17 is a diagram illustrating a user device according to an embodiment of the present disclosure.

Referring to FIG. 17, the user device 400 may include a communication unit 415, a controller 425, and a storage unit 435. The communication unit 415, the controller 425, and the storage unit 435 of the user device 400 may be embodied as a single processor. Alternatively, each of the communication unit 415, the controller 425, and the storage unit 435 may be embodied as a single processor or a plurality of processors. However, the inventive concept is not limited thereto.

The controller 425 of the user device 400 may control the communication unit 415 of the user device 400 to request the cloud server 100 to generate access information.

The user device 400 may receive access information generated by the cloud server 100. For example, the communication unit 415 of the user device 400 may receive access information from the cloud server 100 through a network. The storage unit 435 of the user device 400 may store the access information received from the cloud server 100.

The controller 425 of the user device 400 may control the communication unit 415 of the user device 400 to request the service provider server 500 to provide a service. For example, based on an input of a user, the controller 425 of the user device 400 may control the communication unit 415 of the user device 400 to request parcel delivery service. The communication unit 415 of the user device 400 may request a parcel delivery service provider to provide parcel delivery service. Furthermore, when the communication unit 415 of the user device 400 requests parcel delivery service, the communication unit 415 of the user device 400 may transmit access information received from the cloud server 100 to a parcel delivery service provider server.

If the cloud server 100 fails to authenticate the second device 300, the communication unit 415 of the user device 400 may be requested by the cloud server 100 to determine an authorization of the second device 300.

The communication unit 415 of the user device 400 may receive an authorization determination request in any of various forms from the cloud server 100. For example, an authorization determination request may be received in the form of a text message or a video message.

Based on the received authorization determination request, the controller 425 of the user device 400 may determine whether the second device 300 has an authorization to perform a function provided by the first device 200 that the second device 300 requested to perform.

For example, the controller 425 of the user device 400 may determine an authorization of the second device 300 based on authentication information regarding the second device 300 that is received together with the authorization determination request. Furthermore, the user device 400 may determine an authorization of the second device 300 based on an input of a user. However, the inventive concept is not limited thereto, and the controller 425 of the user device 400 may determine whether the second device 300 has an authorization to perform a function provided by the first device 200 that the second device 300 requested to perform in various ways.

The communication unit 415 of the user device 400 may transmit an authorization determination result to the cloud server 100. Furthermore, the controller 425 of the user device 400 may control the communication unit 415 of the user device 400 to transmit an authorization determination result to the cloud server 100.

Figure 18:
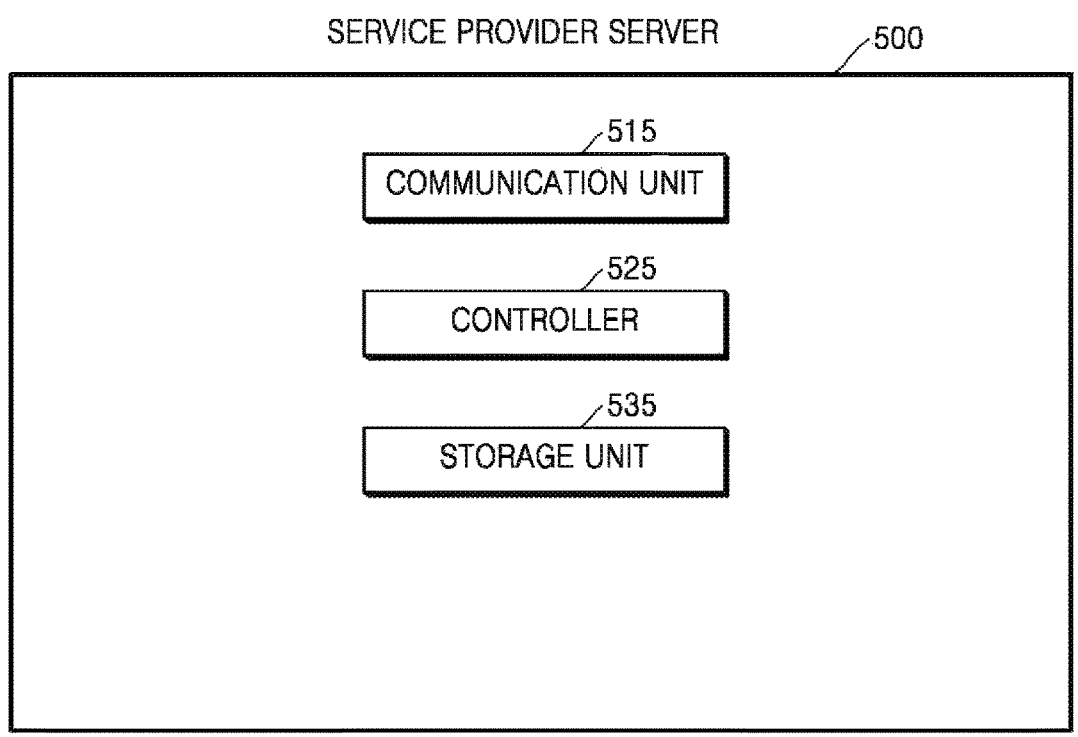
FIG. 18 is a diagram illustrating a service provider server according to an embodiment of the present disclosure.

FIG. 18 is a diagram illustrating a service provider server according to an embodiment of the present disclosure.

Referring to FIG. 18, the service provider server 500 may include a communication unit 515, a controller 525, and a storage unit 535. The communication unit 515, the controller 525, and the storage unit 535 of the service provider server 500 may be embodied as a single processor. Alternatively, each of the communication unit 515, the controller 525, and the storage unit 535 may be embodied as a single processor or a plurality of processors. However, the inventive concept is not limited thereto.

A service provider may use the service provider server 500 to provide a service. For example, a parcel delivery service provider may use the service provider server 500 to provide parcel delivery service.

The communication unit 515 of the service provider server 500 may be requested by the user device 400 to provide a service. For example, the parcel delivery service provider server 500 may receive a request for parcel delivery service from the user device 400.

The communication unit 515 of the service provider server 500 may receive access information regarding the cloud server 100 together with a service request. For example, the communication unit 515 of the service provider server 500 may receive an access key of the cloud server 100 together with a service request.

Based on the received service request, the controller 525 of the service provider server 500 may generate execution authorization information regarding the first device 200. For example, the controller 525 of the service provider server 500 may generate an authentication key by using a service reception number or an arbitrary random number. However, the inventive concept is not limited thereto, and the controller 525 of the service provider server 500 may generate execution authorization information in various ways.

The communication unit 515 of the service provider server 500 may request the cloud server 100 to register execution authorization information generated by the controller 525 of the service provider server 500. For example, communication unit 515 of the service provider server 500 may transmit access information received from the user device 400 and a generated authentication key to the cloud server 100 and request the cloud server 100 to register the authentication key.

The communication unit 515 of the service provider server 500 may transmit execution authorization information regarding the first device 200 generated by the controller 525 of the service provider server 500 to the second device 300. For example, the communication unit 515 of the service provider server 500 may transmit the generated authentication key to the second device 300.

Figure 19:
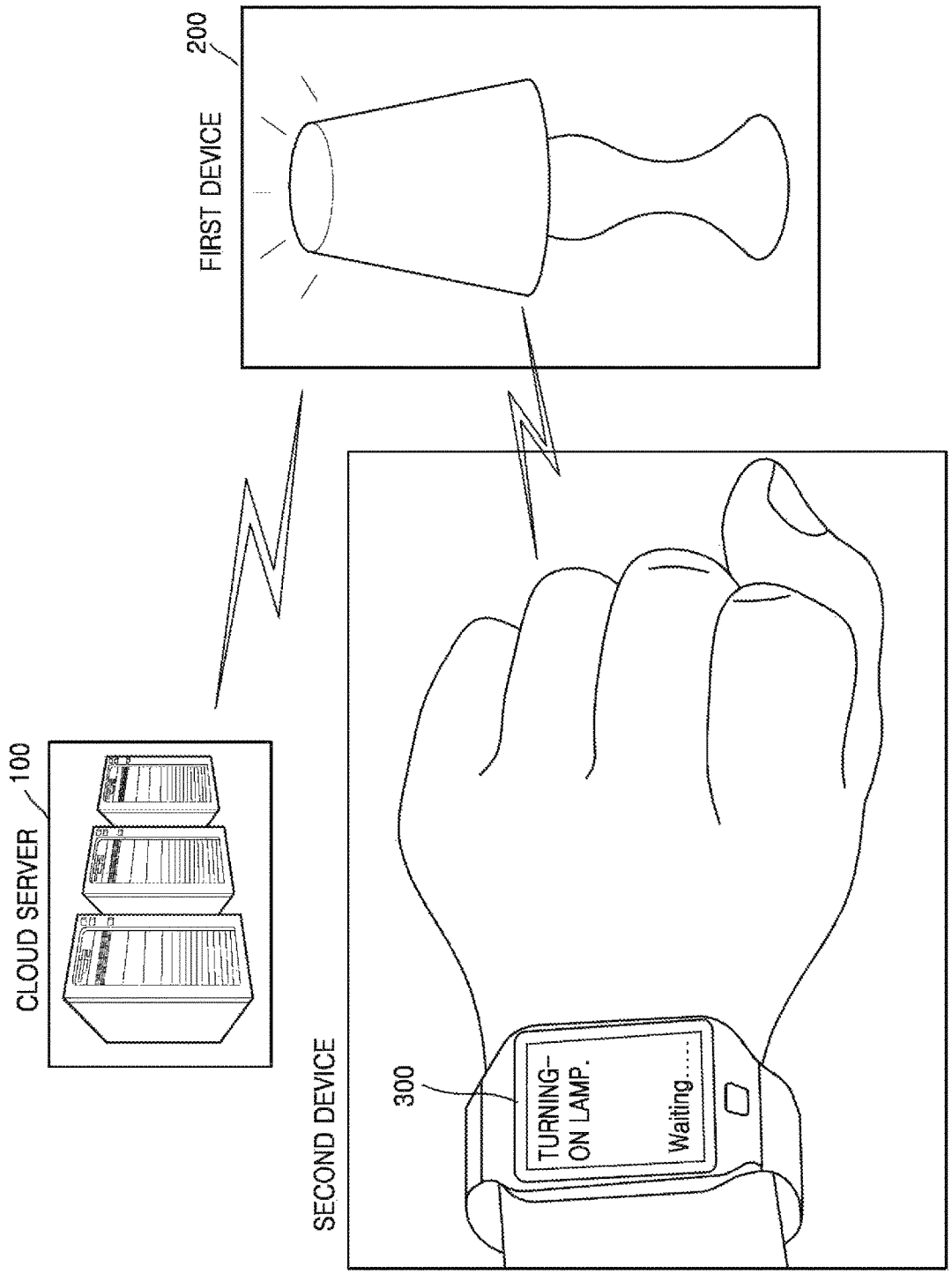
FIG. 19 is a diagram illustrating a method whereby a cloud server controls a first device according to an embodiment of the present disclosure.

FIG. 19 is a diagram illustrating a method whereby a cloud server controls a first device according to an embodiment of the present disclosure.

Referring to FIG. 19, the cloud server 100 may be used in a home network environment. The cloud server 100 may control an access of the second device 300 to the first device 200 connected to a home network. For example, the cloud server 100 may control an access to the first device 200, such that only members of a family may perform functions provided by the first device 200.

The cloud server 100 may register the first device 200. The first device 200 may include a digital door lock, a lamp, a refrigerator, an audio device, and a TV connected to a home network.

At least one function provided by the first device 200 may be registered to the cloud server 100. For example, turn-on function, turn-off function, and brightness control function provided by a lamp (the first device 200) may be registered to the cloud server 100.

Authentication information regarding the second device 300 may be registered to the cloud server 100. The second device 300 may include mobile phones or wearable devices used by members of a family. However, the inventive concept is not limited thereto.

In case of registering authentication information regarding the second device 300 to the cloud server 100, the cloud server 100 may set an execution authorization for performing a function provided by the first device 200 to the authentication information regarding the second device 300. For example, the cloud server 100 may register identification information regarding the second device 300, an authentication key possessed by the second device 300, information regarding a location of the second device 300, a manufacturer's serial number of the second device 300, identification information regarding services supported by the second device 300, or a combination thereof to the cloud server 100. However, the inventive concept is not limited thereto.

The second device 300 may approach to the first device 200. If the second device 300 is located within a certain distance from the first device 200, the second device 300 may be connected to the first device 200. For example, if the second device 300 is located within a critical distance from the first device 200, the second device 300 may be connected to the first device 200.

When the second device 300 is connected to the first device 200, the second device 300 may search for functions provided by the first device 200. For example, referring to FIG. 19, when a wearable device is connected to a lamp, the wearable device may search for functions provided by the lamp, which are turn-on function, turn-off function, and brightness control function.

The second device 300 may request execution of at least one function from among a plurality of found functions. For example, the second device 300 may request execution of at least one function from among a plurality of functions provided by the first device 200, based on an input of a user or a pre-set execution sequence.

Furthermore, second device 300 may transmit authentication information regarding the second device 300 to the first device 200 together with a function execution request. For example, second device 300 may transmit identification information regarding the second device 300, an authentication key possessed by the second device 300, information regarding a location of the second device 300, a manufacturer's serial number of the second device 300, identification information regarding services supported by the second device 300, or a combination thereof. However, the inventive concept is not limited thereto.

Based on the function execution request received from the second device 300, the first device 200 may request the cloud server 100 to authenticate the second device 300. Furthermore, first device 200 may transmit the authentication information regarding the second device 300 to the cloud server 100 together with the request to authenticate the second device 300.

For example, when the first device 200 requests the cloud server 100 to authenticate the cloud server 100, the first device 200 may transmit authentication information regarding the second device 300 to the cloud server 100.

Based on the authentication request from the first device 200, the cloud server 100 may authenticate the second device 300. Furthermore, the cloud server 100 may authenticate the second device 300 by using the authentication information regarding the second device 300 received together with the authentication request from the first device 200.

For example, the cloud server 100 may detect identification information identical to the identification information regarding the second device 300 received together with the authentication request from the first device 200 from information stored in the cloud server 100.

In case of detecting identification information identical to identification information regarding the second device 300 received by the cloud server 100 from information stored in the cloud server 100, the cloud server 100 may determine whether the second device 300 has an authorization to perform a function of the first device 200 that the second device 300 requested to execute, based on an execution authorization pre-set to the detected identification information regarding the second device 300.

If it is determined that the second device 300 has an authorization to perform the function of the first device 200 requested by the second device 300, the cloud server 100 may successfully authenticate the second device 300.

The cloud server 100 may transmit a result of authenticating the second device 300 to the first device 200. Furthermore, based on the received result of authenticating the second device 300, the first device 200 may perform a function that the second device 300 requested to perform.

For example, if a signal indicating that the second device 300 is successfully authenticated is received from the cloud server 100, the first device 200 may perform a function that the second device 300 requested to perform.

Based on a result of authenticating the second device 300 received from the cloud server 100, the first device 200 may transmit a response to an execution request of the second device 300 to the second device 300. For example, the first device 200 may transmit a signal indicating execution of a function requested by the second device 300 or a signal indicating refusal of execution of the function requested by the second device 300 to the second device 300.

The second device 300 may display a text indicating that the cloud server 100 is authenticating the second device 300 on a display screen of the second device 300 from transmission of a request for performing a function provided by the first device 200 to the first device 200 to reception of a response to the execution request from the first device 200. Furthermore, the second device 300 may display an icon indicating that the cloud server 100 is authenticating the second device 300. However, the inventive concept is not limited thereto.

For example, as shown in FIG. 19, the cloud server 100 may be a home network server. The home network server 100 may control accesses to a lamp, a refrigerator, a washing machine, and the like, connected to a home network.

The first device 200 may be a lamp installed in a house, whereas the second device 300 may be digital watches possessed by family members.

A family member may register the lamp 200 to the home network server 100. Furthermore, a family member may register functions provided by the lamp 200 to the home network server 100.

A family member may register authentication information regarding the digital watch 300 to the home network server 100. For example, a family member may register identification information regarding the digital watch 300, an authentication key possessed by the digital watch 300, or a manufactured date of the digital watch 300. However, the inventive concept is not limited thereto.

The digital watch 300 may approach to the lamp 200. Furthermore, if the digital watch 300 is located within a critical distance from the lamp 200, the digital watch 300 may be connected to the lamp 200.

The digital watch 300 may be connected to the lamp 200 and search for functions provided by the lamp 200. Furthermore, the digital watch 300 may request execution of at least one of functions provided by the lamp 200 based on an input of a user of the digital watch 300 or a pre-set request sequence. The digital watch 300 may transmit authentication information regarding the digital watch 300 to the lamp 200 together with the request to perform a function provided by the lamp 200.

Based on the received execution request, the lamp 200 may request the home network server 100 to authenticate the digital watch 300. Furthermore, the lamp 200 may transmit the received authentication information regarding the digital watch 300 to the home network server 100 together with the authentication request.

The home network server 100 may authenticate the digital watch 300 based on the authentication request from the lamp 200. Furthermore, the home network server 100 may authenticate the digital watch 300 based on the authentication information regarding the digital watch 300 received together with the authentication request from the lamp 200.

For example, the home network server 100 may detect identification information identical to the identification information regarding the digital watch 300 received together with the authentication request from the lamp 200 from information stored in the home network server 100.

In case of detecting identification information identical to identification information regarding the digital watch 300 received by the home network server 100 from information stored in the home network server 100, the home network server 100 may determine whether the digital watch 300 has an authorization to perform a function of the lamp 200 that the digital watch 300 requested to execute, based on an execution authorization pre-set to the detected identification information regarding the digital watch 300.

If it is determined that the digital watch 300 has an authorization to perform the function of the lamp 200 requested by the digital watch 300, the home network server 100 may successfully authenticate the digital watch 300.

The home network server 100 may transmit a result of authenticating the digital watch 300 to the lamp 200. Furthermore, based on the received result of authenticating the digital watch 300, the lamp 200 may perform a function that the digital watch 300 requested to perform.

For example, if a signal indicating that the digital watch 300 is successfully authenticated is received from the home network server 100, the lamp 200 may perform a function that the digital watch 300 requested to perform.

Based on a result of authenticating the digital watch 300 received from the home network server 100, the lamp 200 may transmit a response to an execution request of the digital watch 300 to the digital watch 300. For example, the lamp 200 may transmit a signal indicating execution of a function requested by the digital watch 300 or a signal indicating refusal of execution of the function requested by the digital watch 300 to the digital watch 300.

The digital watch 300 may display a text indicating that the home network server 100 is authenticating the digital watch 300 on a display screen of the digital watch 300 from transmission of a request for performing a function provided by the lamp 200 to the lamp 200 to reception of a response to the execution request from the lamp 200. Furthermore, the digital watch 300 may display an icon indicating that the home network server 100 is authenticating the digital watch 300. However, the inventive concept is not limited thereto.

For example, the digital watch 300 may display a text 'waiting' or a sandglass-like icon on a display screen of the digital watch 300. However, the inventive concept is not limited thereto.

Figure 20:
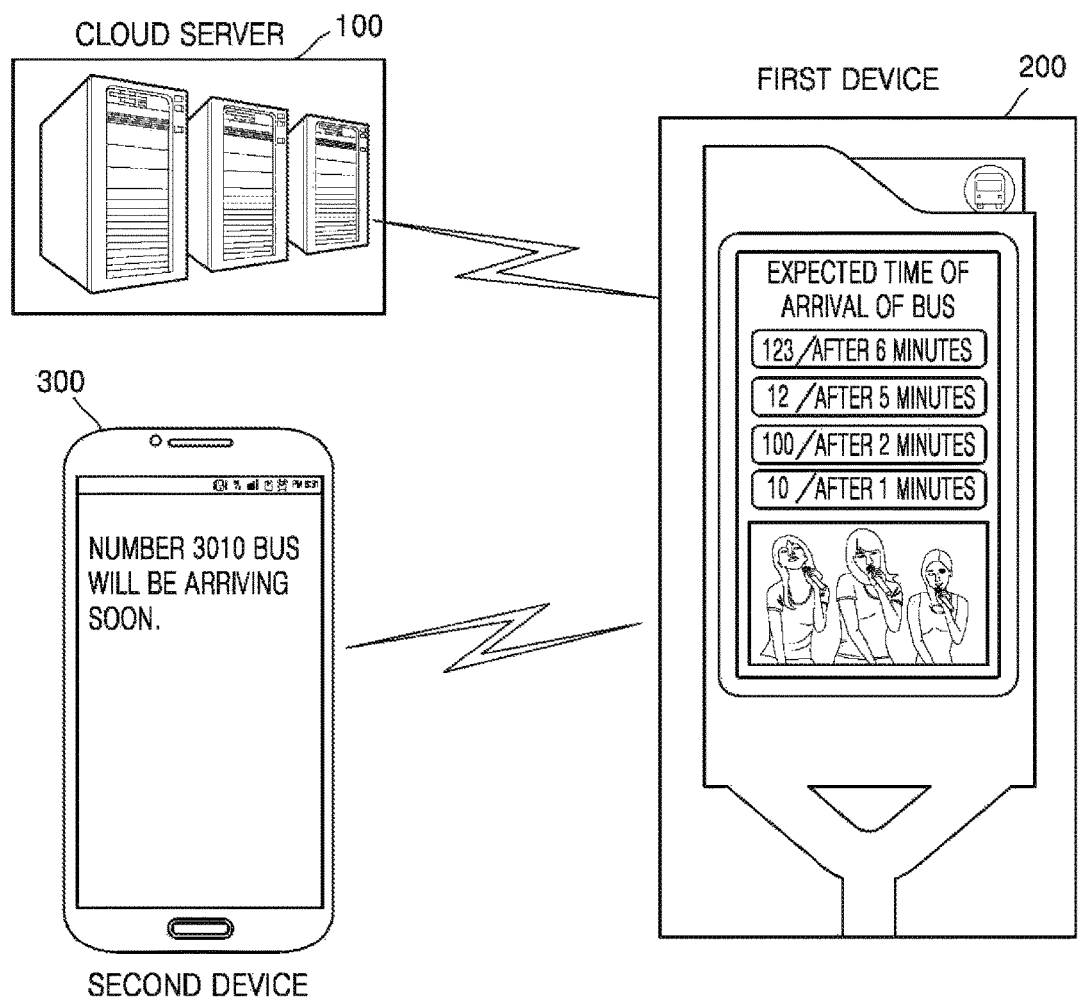
FIG. 20 is a diagram illustrating a method whereby a cloud server controls a first device according to an embodiment of the present disclosure.

FIG. 20 is a diagram illustrating a method whereby a cloud server controls a first device according to an embodiment of the present disclosure.

Referring to FIG. 20, the cloud server 100 may be used to provide public services. The cloud server 100 may control an access of the second device 300 to the first device 200 that is used to provide public services. For example, the cloud server 100 may control an access to the first device 200, such that only persons who need public services may perform functions provided by the first device 200.

The cloud server 100 may register the first device 200 to the cloud server 100. The first device 200 may include devices providing public services. For example, the cloud server 100 may register an electronic bus sign to the cloud server 100.

The cloud server 100 may register the second device 300. Furthermore, the cloud server 100 may register authentication information regarding the second device 300 to the cloud server 100.

For example, the cloud server 100 may register identification information regarding the second device 300, an authentication key possessed by the second device 300, information regarding a location of the second device 300, a manufacturer's serial number of the second device 300, identification information regarding services supported by the second device 300, or a combination thereof to the cloud server 100. However, the inventive concept is not limited thereto.

The second device 300 may approach to the first device 200. If the second device 300 is located within a certain distance from the first device 200, the second device 300 may be connected to the first device 200.

For example, if the second device 300 is located within a critical distance from an electronic bus sign (the first device 200), the second device 300 may be connected to the electronic bus sign 200.

When the second device 300 is connected to the first device 200, the second device 300 may search for functions provided by the first device 200. For example, referring to FIG. 20, when the second device 300 is connected to an electronic bus sign (the first device 200), the second device 300 may search for functions provided by the electronic bus sign 200, which include a bus arrival information service and a bus route information service.

The second device 300 may request execution of at least one function from among a plurality of functions. For example, the second device 300 may request execution of at least one function from among a plurality of functions provided by the first device 200 based on an input of a user or a pre-set execution sequence.

Furthermore, the second device 300 may transmit authentication information regarding the second device 300 to the first device 200 together with a function execution request. For example, the second device 300 may transmit identification information regarding the second device 300, an authentication key possessed by the second device 300, information regarding a location of the second device 300, a manufacturer's serial number of the second device 300, identification information regarding services supported by the second device 300, or a combination thereof. However, the inventive concept is not limited thereto.

Based on the function execution request received from the second device 300, the first device 200 may request the cloud server 100 to authenticate the second device 300. Furthermore, first device 200 may transmit the authentication information regarding the second device 300 to the cloud server 100 together with the request to authenticate the second device 300.

For example, when the first device 200 requests the cloud server 100 to authenticate the cloud server 100, the first device 200 may transmit authentication information regarding the second device 300 to the cloud server 100.

Based on the authentication request from the first device 200, the cloud server 100 may authenticate the second device 300. Furthermore, the cloud server 100 may authenticate the second device 300 by using the authentication information regarding the second device 300 received together with the authentication request from the first device 200.

For example, the cloud server 100 may detect identification information identical to the identification information regarding the second device 300 received together with the authentication request from the first device 200 from information stored in the cloud server 100.

In case of detecting identification information identical to identification information regarding the second device 300 received by the cloud server 100 from information stored in the cloud server 100, the cloud server 100 may determine whether the second device 300 has an authorization to perform a function of the first device 200 that the second device 300 requested to execute, based on an execution authorization pre-set to the detected identification information regarding the second device 300.

If it is determined that the second device 300 has an authorization to perform the function of the first device 200 requested by the second device 300, the cloud server 100 may successfully authenticate the second device 300.

The cloud server 100 may transmit a result of authenticating the second device 300 to the first device 200. Furthermore, based on the received result of authenticating the second device 300, the first device 200 may perform a function that the second device 300 requested to perform.

For example, if a signal indicating that the second device 300 is successfully authenticated is received from the cloud server 100, the electronic bus sign (the first device 200) may provide a bus arrival information service that the second device 300 requested to perform.

For example, as shown in FIG. 20, the cloud server 100 may be a public service server. The public service server 100 may control an access to an electronic bus sign connected to a public network. The first device 200 may be an electronic bus sign used for providing a public service, whereas the second devices 300 may be one of mobile phones possessed by users.

The electronic bus sign 200 may be registered to the public service server 100. Furthermore, functions provided by the electronic bus sign 200 may be registered to the public service server 100.

Users may register authentication information regarding the mobile phones 300 to the public service server 100. For example, users may register identification information regarding the mobile phones 300, authentication keys possessed by the mobile phones 300, or manufactured dates of the mobile phones 300. However, the inventive concept is not limited thereto.

The mobile phone 300 may approach to the electronic bus sign 200. If the mobile phone 300 is located within a certain distance from the electronic bus sign 200, the mobile phone 300 may be connected to the electronic bus sign 200.

For example, if the mobile phone 300 is located within a critical distance from an electronic bus sign 200, the mobile phone 300 may be connected to the electronic bus sign 200.

The mobile phone 300 may be connected to the electronic bus sign 200 and search for functions provided by the electronic bus sign 200. Furthermore, the mobile phone 300 may request execution of at least one function from among a plurality of functions provided by the electronic bus sign 200 based on an input of a user of the mobile phone 300 or a pre-set request sequence. The mobile phone 300 may transmit authentication information regarding the mobile phone 300 together with a request to perform a function provided by the electronic bus sign 200.

Based on the received execution request, the electronic bus sign 200 may request the public service server 100 to authenticate the mobile phone 300. Furthermore, the electronic bus sign 200 may transmit the received authentication information regarding the mobile phone 300 to the public service server 100 together with the authentication request.

The public service server 100 may authenticate the mobile phone 300 based on the authentication request from the electronic bus sign 200. Furthermore, the public service server 100 may authenticate the mobile phone 300 based on the authentication information regarding the mobile phone 300 received together with the authentication request from the electronic bus sign 200.

For example, the public service server 100 may detect identification information identical to the identification information regarding the mobile phone 300 received together with the authentication request from the electronic bus sign 200 from information stored in the public service server 100.

In case of detecting identification information identical to identification information regarding the mobile phone 300 received by the public service server 100 from information stored in the public service server 100, the public service server 100 may determine whether the mobile phone 300 has an authorization to perform a function of the electronic bus sign 200 that the mobile phone 300 requested to execute, based on an execution authorization pre-set to the detected identification information regarding the mobile phone 300.

If it is determined that the mobile phone 300 has an authorization to perform the function of the electronic bus sign 200 requested by the mobile phone 300, the public service server 100 may successfully authenticate the mobile phone 300.

The public service server 100 may transmit a result of authenticating the mobile phone 300 to the electronic bus sign 200. Furthermore, based on the received result of authenticating the mobile phone 300, the electronic bus sign 200 may perform a function that the mobile phone 300 requested to perform.

For example, if a signal indicating that the mobile phone 300 is successfully authenticated is received from the public service server 100, the electronic bus sign 200 may provide bus arrival information service that the mobile phone 300 requested to perform.

Based on a result of authenticating the mobile phone 300 received from the public service server 100, the electronic bus sign 200 may transmit a response to an execution request of the mobile phone 300 to the mobile phone 300. For example, the electronic bus sign 200 may transmit a signal indicating execution of a function requested by the mobile phone 300 or a signal indicating refusal of execution of the function requested by the mobile phone 300 to the mobile phone 300.

FIG. 21 is a diagram illustrating a method whereby a cloud server controls a first device according to an embodiment of the present disclosure.

Referring to FIG. 21, the cloud server 100 may be used for providing a service in a business environment. The cloud server 100 may control an access of the second device 300 to the first device 200 used for providing a service in a business environment. For example, the cloud server 100 may control an access to the first device 200, such that only persons who need coupon services may perform functions provided by the first device 200.

The cloud server 100 may register the first device 200 to the cloud server 100. The first device 200 may include a device that provides a shop management service. For example, the cloud server 100 may provide a business service providing device to the cloud server 100.

The cloud server 100 may register the second device 300. Furthermore, the cloud server 100 may register authentication information regarding the second device 300 to the cloud server 100.

For example, the cloud server 100 may register identification information regarding the second device 300, an authentication key possessed by the second device 300, information regarding a location of the second device 300, a manufacturer's serial number of the second device 300, identification information regarding services supported by the second device 300, or a combination thereof to the cloud server 100. However, the inventive concept is not limited thereto.

The second device 300 may approach to the first device 200. If the second device 300 is located within a certain distance from the first device 200, the second device 300 may be connected to the first device 200.

For example, if the second device 300 is located within a critical distance from a business service providing device 200 (the first device 200), the second device 300 may be connected to the business service providing device (the first device 200).

When the second device 300 is connected to the first device 200, the second device 300 may search for functions provided by the first device 200. For example, referring to FIG. 20, when the second device 300 is connected to a business service providing device (the first device 200), the second device 300 may search for functions provided by the business service providing device 200, which are coffee order service, internes connection service, and coupon service.

The second device 300 may request execution of at least one function from among a plurality of functions. For example, the second device 300 may request execution of at least one function from among a plurality of functions provided by the first device 200 based on an input of a user or a pre-set execution sequence.

For example, if the second device 300 is connected to a business service providing device (the first device 200), the second device 300 may search for functions provided by the business service providing device 200, which are coffee order service, interne connection service, and coupon service, and request the coffee order service from among the found services based on a pre-set execution sequence.

Furthermore, the second device 300 may transmit authentication information regarding the second device 300 to the first device 200 together with a function execution request. For example, the second device 300 may transmit identification information regarding the second device 300, an authentication key possessed by the second device 300, information regarding a location of the second device 300, a manufacturer's serial number of the second device 300, identification information regarding services supported by the second device 300, or a combination thereof. However, the inventive concept is not limited thereto.

Based on the function execution request received from the second device 300, the first device 200 may request the cloud server 100 to authenticate the second device 300. Furthermore, first device 200 may transmit the authentication information regarding the second device 300 to the cloud server 100 together with the request to authenticate the second device 300.

For example, when the first device 200 requests the cloud server 100 to authenticate the cloud server 100, the first device 200 may transmit authentication information regarding the second device 300 to the cloud server 100.

Based on the authentication request from the first device 200, the cloud server 100 may authenticate the second device 300. Furthermore, the cloud server 100 may authenticate the second device 300 by using the authentication information regarding the second device 300 received together with the authentication request from the first device 200.

For example, the cloud server 100 may detect identification information identical to the identification information regarding the second device 300 received together with the authentication request from the first device 200 from information stored in the cloud server 100.

In case of detecting identification information identical to identification information regarding the second device 300 received by the cloud server 100 from information stored in the cloud server 100, the cloud server 100 may determine whether the second device 300 has an authorization to perform a function of the first device 200 that the second device 300 requested to execute, based on an execution authorization pre-set to the detected identification information regarding the second device 300.

If it is determined that the second device 300 has an authorization to perform the function of the first device 200 requested by the second device 300, the cloud server 100 may successfully authenticate the second device 300.

The cloud server 100 may transmit a result of authenticating the second device 300 to the first device 200. Furthermore, based on the received result of authenticating the second device 300, the first device 200 may perform a function that the second device 300 requested to perform.

For example, if a signal indicating that the second device 300 is successfully authenticated is received from the cloud server 100, the business service providing device (the first device 200) may provide the coffee order service that the second device 300 requested to perform.

The cloud server 100 may provide a statistical service regarding the registered second device 300. For example, the cloud server 100 may provide information regarding stores frequently used by the second device 300. Furthermore, the cloud server 100 may provide information regarding a coffee frequently ordered by the second device 300. However, the inventive concept is not limited thereto.

The cloud server 100 may provide a statistical service regarding the registered first device 200. For example, the cloud server 100 may provide a statistical service regarding devices that a business service providing device (the registered first device 200) requests to authenticate.

For example, as shown in FIG. 21, the cloud server 100 may be a business service server. The business service server 100 may control an access to a business service providing device connected to a business network. The second devices 300 may be one of mobile phones possessed by users.

The business service providing device 200 may be registered to the business service server 100. Furthermore, functions provided by the business service providing device 200 may be registered to the business service server 100. For example, coupon issuing function provided by the business service providing device 200 may be registered to the business service server 100.

Users may register authentication information regarding the mobile phones 300 to the business service server 100. For example, users may register identification information regarding the mobile phones 300, authentication keys possessed by the mobile phones 300, or manufactured dates of the mobile phones 300. However, the inventive concept is not limited thereto.

The mobile phone 300 may approach to the business service providing device 200. Furthermore, if the mobile phone 300 is located within a critical distance from a business service providing device 200, the mobile phone 300 may be connected to the business service providing device 200.

The mobile phone 300 may be connected to the business service providing device 200 and search for functions provided by the business service providing device 200. Furthermore, the mobile phone 300 may request execution of at least one function from among a plurality of functions provided by the business service providing device 200 based on an input of a user of the mobile phone 300 or a pre-set request sequence. For example, the mobile phone 300 may request the business service providing device 200 to perform a coupon issuing function.

Furthermore, the mobile phone 300 may transmit authentication information regarding the mobile phone 300 together with a request to perform a function provided by the business service providing device 200.

Based on the received execution request, the business service providing device 200 may request the business service server 100 to authenticate the mobile phone 300. Furthermore, the business service providing device 200 may transmit the received authentication information regarding the mobile phone 300 to the business service server 100 together with the authentication request.

The business service server 100 may authenticate the mobile phone 300 based on the authentication request from the business service providing device 200. Furthermore, the business service server 100 may authenticate the mobile phone 300 based on the authentication information regarding the mobile phone 300 received together with the authentication request from the business service providing device 200.

For example, the business service server 100 may detect identification information identical to the identification information regarding the mobile phone 300 received together with the authentication request from the business service providing device 200 from information stored in the business service server 100.

In case of detecting identification information identical to identification information regarding the mobile phone 300 received by the business service server 100 from information stored in the business service server 100, the business service server 100 may determine whether the mobile phone 300 has an authorization to perform a function of the business service providing device 200 that the mobile phone 300 requested to execute, based on an execution authorization pre-set to the detected identification information regarding the mobile phone 300.

If it is determined that the mobile phone 300 has an authorization to perform the function of the business service providing device 200 requested by the mobile phone 300, the business service server 100 may successfully authenticate the mobile phone 300.

The business service server 100 may transmit a result of authenticating the mobile phone 300 to the business service providing device 200. Furthermore, based on the received result of authenticating the mobile phone 300, the business service providing device 200 may perform a function that the mobile phone 300 requested to perform.

For example, if a signal indicating that the mobile phone 300 is successfully authenticated is received from the business service server 100, the business service providing device 200 may provide coupon issuing service that the mobile phone 300 requested to perform.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method, performed by a cloud server, of managing a device, the method comprising:
   recording information identifying a first device connected to the cloud server through a network;
   recording information indicating at least one function provided by the first device;
   recording execution authorization information indicating an object capable of performing the at least one function;
   receiving from the first device, a request for determining whether a second device that requests execution of the at least one function provided by the first device has authorization to perform the at least one function provided by the first device;
   authenticating, based at least in part on the execution authorization information, whether the second device has the authorization to perform the at least one function provided by the first device; and
   transmitting a result of the authenticating to the first device,
   wherein the cloud server updates the execution authorization information through a device which is an administrator of the first device.

2. The method of claim 1, wherein, in the receiving of the request, authentication information regarding the second device, which is received by the first device from the second device, is also received by the cloud server.

3. The method of claim 1, wherein the authenticating comprises:
   transmitting, if the second device has no authorization to perform the at least one function provided by the first device, an authorization determination request to the device of the administrator of the first device; and
   receiving an authentication determination result from the device of the administrator of the first device.

4. The method of claim 1, wherein the authenticating comprises determining whether the second device has authorization to perform the at least one function provided by the first device by comparing authentication information regarding the second device included in the request to the execution authorization information.

5. The method of claim 4, further comprising:
   deleting, if it is determined that the second device has authorization to perform the at least one function provided by the first device, information corresponding to the authentication information in the execution authorization information.

6. The method of claim 1, further comprising:
   receiving an input of an administrator of the first device and deleting the execution authorization information.

7. The method of claim 1, wherein the recording of the execution authorization information regarding the first device comprises:
   receiving the execution authorization information and access information regarding the first device;
   determining whether to register the execution authorization information based on the access information; and
   registering the execution authorization information based on a result of the determination.

8. The method of claim 1, wherein the execution authorization information includes at least one of device identification information, an authentication key, or service identification information.

9. At least one non-transitory computer-readable recording medium for storing a computer program configured to be readable by at least one processor for instructing the at least one processor to execute a computer process for performing the method of claim 1.

10. A cloud server comprising:
a memory; and
at least one processor coupled to the memory and configured to:
record information identifying a first device connected to the cloud server through a network,
record information indicating at least one function provided by the first device,
record execution authorization information indicating an object capable of performing the at least one function, and
authenticate, based at least in part on the execution authorization information, whether a second device has authorization to perform the at least one function provided by the first device; and
a communicator configured to:
receive, from the first device, a request for authenticating whether the second device that requests execution of the at least one function provided by the first device has the authorization to perform the at least one function provided by the first device, and transmit a result of the authenticating to the first device,
wherein the cloud server is implemented as a hardware device, and
wherein the cloud server updates the execution authorization information through a device which is an administrator of the first device.

11. The cloud server of claim 10, wherein the communicator is further configured to receive authentication information regarding the second device received by the first device from the second device.

12. The cloud server of claim 10,
wherein, if the second device has no authorization to perform the at least one function provided by the first device, the at least one processor is further configured to control transmission of an authorization determination request to a device of an administrator of the first device, and
wherein the communicator is further configured to receive an authentication determination result from the device of the administrator of the first device.

13. The cloud server of claim 10, wherein the at least one processor is further configured to determine whether the second device has authorization to perform the at least one function provided by the first device by comparing authentication information regarding the second device included in the request to the execution authorization information.

14. The cloud server of claim 13, wherein, if it is determined that the second device has authorization to perform the at least one function provided by the first device, the at least one processor is further configured to delete information corresponding to the authentication information in the execution authorization information.

15. The cloud server of claim 10, wherein the at least one processor is further configured to:
receive an input of an administrator of the first device, and
delete the execution authorization information.

16. The cloud server of claim 10, wherein the at least one processor is further configured to:
receive the execution authorization information and access information regarding the first device,
determine whether to register the execution authorization information based on the access information, and
register the execution authorization information based on a result of the determination.

* * * * *